United States Patent
Thoppil et al.

(10) Patent No.: US 12,204,800 B2
(45) Date of Patent: Jan. 21, 2025

(54) PREFETCHING KEYS FOR GARBAGE COLLECTION

(71) Applicant: NetApp Inc., San Jose, CA (US)

(72) Inventors: Anil Paul Thoppil, Pleasanton, CA (US); Wei Sun, Boulder, CO (US); Meera Odugoudar, Milpitas, CA (US); Szu-Wen Kuo, Taipei (TW); Santhosh Selvaraj, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 374 days.

(21) Appl. No.: 17/732,065

(22) Filed: Apr. 28, 2022

(65) Prior Publication Data
US 2023/0350610 A1    Nov. 2, 2023

(51) Int. Cl.
*G06F 3/06* (2006.01)
*G06F 12/02* (2006.01)

(52) U.S. Cl.
CPC .......... *G06F 3/068* (2013.01); *G06F 12/0253* (2013.01); *G06F 3/0602* (2013.01); *G06F 3/0652* (2013.01)

(58) Field of Classification Search
CPC .... G06F 3/068; G06F 12/0253; G06F 3/0602; G06F 3/0652; G06F 2201/885; G06F 2212/254; G06F 2212/284; G06F 12/0868; G06F 16/24552; G06F 16/28; G06F 2212/261; G06F 2212/401; G06F 2212/465; G06F 2212/466; G06F 2212/502; G06F 2212/7205; G06F 3/061; G06F 3/0638; G06F 3/0656; G06F 3/067; G06F 2212/154; G06F 12/0862
See application file for complete search history.

(56) References Cited

U.S. PATENT DOCUMENTS

| 11,023,318 B1 | 6/2021 | Volkov et al. |
| 11,971,859 B2 | 4/2024 | Thoppil et al. |
| 2020/0192940 A1 | 6/2020 | Tomlinson |
| 2020/0201821 A1 | 6/2020 | Wang et al. |
| 2020/0320081 A1 | 10/2020 | Fanghaenel et al. |
| 2021/0067332 A1 | 3/2021 | Roy et al. |
| 2021/0397345 A1 | 12/2021 | Jawahar et al. |

(Continued)

OTHER PUBLICATIONS

Final Office Action mailed on Feb. 16, 2024 for U.S. Appl. No. 17/732,098, filed Apr. 28, 2022, 32 pages.

(Continued)

*Primary Examiner* — David Yi
*Assistant Examiner* — Alan Otto
(74) *Attorney, Agent, or Firm* — Cooper Legal Group, LLC

(57) ABSTRACT

Techniques are provided for implementing a garbage collection process and a prediction read ahead mechanism to prefetch keys into memory to improve the efficiency and speed of the garbage collection process. A log structured merge tree is used to store keys of key-value pairs within a key-value store. If a key is no longer referenced by any worker nodes of a distributed storage architecture, then the key can be freed to store other data. Accordingly, garbage collection is performed to identify and free unused keys. The speed and efficiency of garbage collection is improved by dynamically adjusting the amount and rate at which keys are prefetched from disk and cached into faster memory for processing by the garbage collection process.

20 Claims, 11 Drawing Sheets

(56) References Cited

U.S. PATENT DOCUMENTS

| | | |
|---|---|---|
| 2022/0156087 A1* | 5/2022 | Karr .................... G06F 12/0246 |
| 2022/0156231 A1* | 5/2022 | Wang .................. G06F 16/9027 |
| 2022/0382760 A1 | 12/2022 | Pang et al. |
| 2023/0350810 A1 | 11/2023 | Thoppil et al. |
| 2023/0350850 A1 | 11/2023 | Thoppil et al. |
| 2024/0281411 A1 | 8/2024 | Thoppil et al. |

OTHER PUBLICATIONS

Non-Final Office Action mailed on Aug. 3, 2023 for U.S. Appl. No. 17/732,046, filed Apr. 28, 2022, 13 pages.
Fei Mei, et al.; LSM-tree Managed Storage for Large-Scale Key-Value Store; 15 Pgs.
Alexander Conway; Understanding Dictionaries at the Intersection of Theory and Practice; Oct. 2020; 145 Pgs.
Notice of Allowance mailed on Mar. 28, 2024 for U.S. Appl. No. 17/732,046, filed Apr. 28, 2022, 04 pages.
Non-Final Office Action mailed on Sep. 28, 2023 for U.S. Appl. No. 17/732,098, filed Apr. 28, 2022, 28 pages.
Notice of Allowance mailed on Nov. 28, 2023 for U.S. Appl. No. 17/732,046, filed Apr. 28, 2022, 7 pages.
Non Final Office Action mailed Jun. 11, 2024 for U.S. Appl. No. 17/732,098, filed Apr. 28, 2022, 39 pages.
Final Office Action mailed on Sep. 17, 2024 for U.S. Appl. No. 17/732,098, filed Apr. 28, 2022, 37 pages.
Notice of Allowance mailed on Dec. 4, 2024 for U.S. Appl. No. 17/732,098, filed Apr. 28, 2022, 11 pages.

\* cited by examiner

PREFETCHING KEYS FOR GARBAGE COLLECTION

TECHNICAL FIELD

Various embodiments of the present technology relate to garbage collection. More specifically, some embodiments relate to prefetching keys to improve garbage collection.

BACKGROUND

Databases are often used by storage systems for storing, retrieving, and managing data on behalf of clients. There are various types of databases that a storage system could utilize. These databases may include a relational database, an object-oriented database, a hierarchical database, a key-value store, and/or a variety of other types of databases.

Traditional relational databases have historically been the most commonly used type of database. Relational databases provide a predefined database structure with predefined data types. By predefining the database structure and data types, this information can be exposed to the database program and allow for certain optimizations. For example, data can be stored in tables comprised of rows and columns. Each column of a table can be assigned a data type. The data type may include a date, text, an integer number, etc. Each row in the table has a place for a value for each column even if that entry has no data to be stored (e.g., a "null" value).

Traditional relational databases have various limitations that make them less desirable or completely unsuitable for many storage use cases. A traditional relational database, for example, is unable to scale out to store large quantities of data across different servers because traditional relational databases are designed to run on a single server in order to maintain integrity of table mappings. As another example, relational databases allocate memory for the different data entries even when there is no data to be stored within a particular field. The memory allocation results in an increase in memory usage. As a result, these limitations negatively affect performance, increase latency, and can result in data availability issues if the only server hosting a database fails. Also, relational databases are only able to store data in tabular form, which makes representing complex relationships between objects difficult.

Instead of viewing data in the row and column format of relational databases, key-value stores treat data as a collection of data. Each key-value pair in a key-value store may have different fields thereby allowing considerable flexibility since the structure of the key-value pair does not have to be predefined and optional values are not represented by empty placeholders. Moreover, the key-value format used by key-value stores to store and retrieve data can be very fast for write and read operations. Data (e.g., a string, a complex object, a music file, a picture, etc.) may be stored as a value (a value data item) in the key-value store. In order to locate the value data item, the value data item may be paired with a unique key used to identify/reference the value data item. In this way, the value data item and the key may be stored in the key-value store as a key-value pair. Typical use cases for key-value stores include, but are not limited to, session management at a high scale, user preference and user profile storage, content recommendation storage, a cache for frequently accessed but rarely updated data, and the like.

DESCRIPTION OF THE DRAWINGS

Embodiments of the present technology will be described and explained through the use of the accompanying drawings in which.

Figure 1:
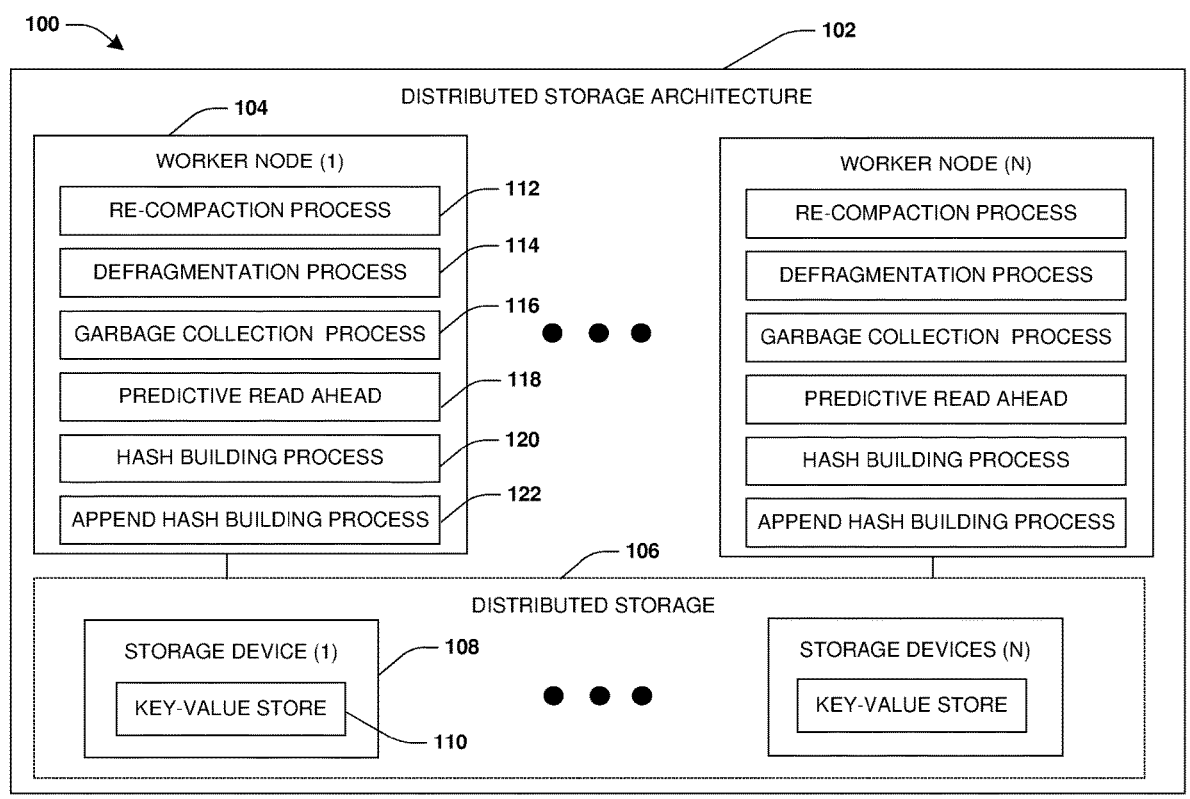
FIG. 1 is a block diagram illustrating an example of a distributed storage architecture within which a key-value store is hosted in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to defragmentation. More specifically, some embodiments relate to implementing a defragmentation process during re-compaction of keys within a log structured merge tree to improve read and write amplification. A distributed storage architecture provides clients with the ability to store data within distributed storage. The distributed storage is managed by worker nodes (e.g., worker machines that run containerized applications and other workloads) within a containerized distributed storage architecture environment that process client I/O operations directed to the distributed storage. The worker nodes store data in the distributed storage as key-value pairs within a key-value store. The clients may store any type of data within the key-value store. The type of data may include a text file, a media file, a block of data, or any other variable sized blob of data. As part of storing data within the key-value store, a key-value pair is created. The data is stored as a value (a value data item) of the key-value pair. A key is generated for the value in order to uniquely identify the value, and is also part of the key-value pair. In some embodiments, the key may be generated by a random hashing function (e.g., a random cryptographic content hashing function) that takes the value as an input and outputs a random hash of the value as the key for the value. The key is used to index and locate the value within the key-value store in the distributed storage.

The keys may be stored within a log structured merge tree for easy storage and retrieval. The log structured merge tree may comprise one or more levels of logs within which keys are stored. Keys may be initially inserted into append logs of the log structured merge tree. These append logs are not sorted, and thus it may be costly to search the append logs for a particular key. Accordingly, a re-compaction process may be performed to merge keys down to lower levels of the log structured merge tree to re-compact the keys. As part of the re-compaction process, keys are sorted and stored within sorted logs of the log structured merge tree so that the keys can be easily located because the sorted logs are sorted.

Because the keys correspond to random hashes of data (values), key insert operations performed by the re-compaction process to insert the keys into the sorted logs can result in fragmentation of the keys within storage of the distributed storage due to the lack of spatial locality of the key insert operations because of the randomness of the keys. Similar keys are sorted together. But since the data is not part of a re-compaction process, write amplification is reduced because the data is not being moved and written to different locations. Keys that are next to each other in the sorted log may have data at different locations within the distributed storage since the data is not moved during the re-compaction process. Storing the keys next to each other can be achieved since filesystem pointers of virtual volume block numbers and physical volume block numbers (vvbn, pvbn) are used to point to the data and is maintained along with the key. If keys with the same prefix are written at different timeframes, then the keys may be at different physical locations in a storage device of the distributed storage, thus causing fragmentation.

Write amplification is where the amount of physically written data to a storage device is a multiple of the logical amount of data intended to be stored (e.g., writing the key and the indirect block results in double write amplification). Write amplification results in reduced write performance, increased latency, increased storage bandwidth utilization, and reduced lifespan of storage devices because completion of a single write operation of a key requires multiple write operations to a storage device. Because the similar keys (keys with the same prefix) are not stored together within the distributed storage a read operation targeting a range of keys will result in multiple read operations, thus causing read amplification because the keys must be separately read from different locations on a storage device instead of from a single contiguous range. As will be further discussed below, read and write amplification are reduced by performing defragmentation on a lowest level of the log structured merge tree during the re-compaction process.

The re-compaction process performs merge operations to merge the keys down to lower levels of the log structured merge tree. A merge operation may be triggered when a log within a level of the log structured merge tree becomes full. In this way, keys within the log are re-compacted down to a lower level by the merge operation. When a key is to be retrieved from the key value store, a hash is used as part of the retrieval. The hash is built during a re-compaction process where two sorted logs are combined into a new log. The hash identifies the starting locations of the bins within the new log, which can be used to start searching the new log for the key at the starting location of a bin within which the key is stored.

The key-value store is managed by the plurality of worker nodes of the distributed storage architecture. At any given point in time, a worker node may reference key-values pairs within the key-value store. For example, a worker node may store a block of data as a value of a key-value pair within the key-value store, and thus the worker node references that key-value pair. If the worker node deletes the block of data, then the worker node no longer references the key-value pair, and thus the storage resources or memory used to store the key-value pair can be freed during garbage collection and used to store other data. When a particular worker node performs garbage collection, the worker node can only free a key if all other worker nodes do not reference that key. Each worker node creates a probabilistic structure (e.g., a bloom filter) indicative of keys in-use by that worker node. These in-use keys are part of key-value pairs having values (data) still referenced by at least one worker node. The worker nodes send the probabilistic structures to other worker nodes for performing garbage collection. A worker node compares the probabilistic structures to keys managed by the worker node. If the probabilistic structures indicate that any one of the keys are not in-use, then the storage resources or memory used to store those keys can be freed for storing other data. During garbage collection, the keys managed by the worker node are read from a storage device of the distributed storage into memory. Reading the keys from the storage device into memory can be a time-consuming operation due to reading the keys from the storage device, thus delaying and making garbage collection inefficient. As will be further discussed below, the time and efficiency of garbage collection is improved by prefetching and caching into memory keys that will be subsequently processed by garbage collection.

The log structured merge tree uses append logs to track keys of the key-value store. The append logs are not sorted. In order to locate a key within an append log, a binary search of the entire append log must be performed. This is a time consuming and costly operation. In particular, when a range get operation is performed to get a set of keys within a particular range (e.g., keys having the same or similar prefixes), the entire append log is search in order to locate the keys within the range (e.g., keys matching a prefix specified by the range get operation) because the keys are not sorted. As will be further discussed below, instead of performing the costly and time-consuming binary search of an entire append log, hashes are created with buckets, maps, hash entries, and pointers in order to quickly and efficiently identify ranges of keys having the same prefixes.

The techniques provided herein improve the key-value store and operations performed for the key-value store. These operations may include re-compaction operations, merge operations, key searching operations, garbage collection, rebalancing processes, etc. Keys of the key-value store are stored within a log structured merge tree. The recompaction and merge operations are performed to merge and sort keys within the log structured merge tree in order to free up space for storing new keys within the log structured merge tree. The key searching operations are performed to locate particular keys within the log structured merge tree. Garbage collection is performed to free storage resources or memory used to store keys so that the resources or memory can be used to store other data or new keys. The rebalancing processes are performed to redistribute (rebalance) data amongst storage devices of the worker nodes within the distributed storage architecture. These operations can consume a significant amount of processing resources, network bandwidth, and storage resources. The techniques provided herein improve these types of operations in order to reduce the time and resources consumed by performing these operations. In some embodiments, these operations are improved by performing defragmentation during the operations in a non-disruptive manner that does not interrupt client I/O process. The operations also improve key searching operations by building and utilizing in-memory hash entries that can be used to more quickly locate keys. Searching for keys within append logs of the log structured merge tree is also improved by creating hashes that can be used to more quickly locate keys. Garbage collection is improved by prefetching and caching keys from storage into memory so that the keys are readily available in the memory for processing by garbage collection.

In addition, various embodiments of the present technology provide for a wide range of technical effects, advantages, and/or improvements to computing systems and components. For example, various embodiments may include one or more of the following technical effects, advantages, and/or improvements: 1) performing defragmentation during a last level merge operation in order to store keys with the same prefixes together in the distributed storage, thus achieving defragmentation; 2) performing defragmentation to avoid costly random read operations and to reduce read and write amplification otherwise occurring if keys were fragmented and not stored together in the distributed storage; 3) performing defragmentation upon a container file pointing to blocks on disk comprising keys and not modifying the actual blocks on in the distributed storage so that defragmentation can be performed without interrupting client I/O access to the blocks in the distributed storage; 4) building an in-memory hash during a merge operation so that no extra traversal of the log structured merge tree is needed to build the in-memory hash, thus effectively reducing the overhead cost to build the in-memory hash entries to almost nothing; 5) utilizing the in-memory hash to reduce the search time for locating certain keys or ranges of keys within the log structured merge tree because the in-memory hash provides starting locations of bins within sorted logs so that the entire sorted logs do not need to be searched but just the bins; 6) implementing a predictive read ahead mechanism to dynamically adjust the amount and/or rate of prefetching and caching keys into memory to improve the speed of garbage collection; and/or 7) reducing the amount of data searched within unsorted append logs to speed up append log searching by creating and utilizing hashes to locate and search only within buckets of an append log that match prefixes of keys being searched.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to network storage appliances and key-value stores, embodiments of the present technology are equally applicable to various other types of hardware, software, and/or storage.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1 is a block diagram illustrating an example of a distributed storage architecture 102 within which a key-value store 110 is hosted in accordance with an embodiment of the present technology. In the embodiments illustrated in FIG. 1, the distributed storage architecture 102 comprises worker nodes. The worker nodes may include a first worker node 104 and/or other worker nodes. The worker nodes may be implemented as containers within a container orchestration platform (e.g., Kubernetes), serverless threads, servers, virtual machines, etc. The worker nodes are configured to manage distributed storage 106. The distributed storage 106 may be composed for a plurality of storage devices that are managed by the worker nodes. In some embodiments, the first worker node 104 manages a storage device 108 and/or other storage devices. In some embodiments, a single worker node may manage a single storage device or multiple storage devices. In some embodiments, a storage device is managed by a single worker node. In some embodiments, a storage device may be managed by multiple worker nodes. In some embodiments, a storage device may be managed by a single worker node, but is accessible by other worker nodes that are not managing the storage device. The worker nodes may store various types of data within the storage devices of the distributed storage 106. In this way, the worker nodes may store data on behalf of clients within the distributed storage 106.

One type of data structure that the worker nodes may utilize to store on data behalf of the clients within the distributed storage is the key value store 110. The key-value store 110 may be stored across the storage devices of the distributed storage 106. The first worker node 104 may provide a client with access to the key-value store 110 such that client data is stored within key-value pairs of the key-value store 110. In this way, the key-value pairs storing data (e.g., client data and/or metadata) managed by the first worker node 104 may be referenced by the first worker node 104. That is, a key-value pair is referenced by a worker node if the worker node is storing and managing the key-value pair on behalf of a client. If data is deleted and is no longer used by the first worker node 104, then corresponding key-value pairs storing that data are no longer referenced by the first worker node 104.

The worker nodes may implement various processes that improve the key-value store 110 in order to make the key-value store 110 more performant and utilize resources (e.g., compute resources and storage resources) more efficiently. Various embodiments of the present technology improve read and write amplification through defragmentation. In some embodiments, defragmentation is implemented as a process to reduce fragmentation of keys on a storage device (e.g., keys may be fragmented when the keys are not stored together within contiguous regions) by physically organizing keys within the storage device into a smallest number of contiguous regions. As previously discussed, a re-compaction process performs merge operations to merge keys down to lower levels of a log structured merge tree 208. When performing a last level merge operation upon a lowest level of the log structured merge tree 208, a defragmentation process is performed upon the keys in the lowest level in order to store the keys together (e.g., in the smallest number of continuous regions within the data storage). For example, keys with the same or similar prefixes are stored in contiguous blocks in the distributed storage. The keys in the lowest level may have a longer lifespan than keys within higher levels of the log structured merge tree 208, and thus merely data that will remain for a longer period of time is defragmented. That is, keys are initially inserted into the log structured merge tree 208 at the top levels of the log structured merge tree 208 (e.g., the append log hash 214, and then the active append log 218 of level AO 250). At a subsequent point in time, any keys that have not yet been deleted are merged down into lower levels of the log structure merge tree 208 (e.g., keys within the level AO 250 are merged down into the active sort log 226 of the level S1 252; keys within the level S1 252 are merged down into the level S2 254, etc.). In this way, keys within the lower level of the log structured merge tree 208 are keys that have not been deleted and have been residing within the log structured merge 208 longer than keys within higher up levels. Defragmenting the data that will remain for a longer period of time is beneficial because defragmentation is relatively expensive to perform so resources are not wasted in defragmenting keys in higher levels of the log structured merge tree 208 because these keys may have shorter lifespans in the key-value store.

Defragmentation helps avoid performing random read operations when data is being rebalanced across worker nodes of the distributed storage architecture because the keys can be read from a contiguous range of blocks within the distributed storage as opposed to being read from various random locations within the distributed store. The data may be rebalanced by a rebalancing process for various reasons such as for load balancing or performing a failover from a failed worker node to a surviving worker node. Because defragmentation was performed, a next read operation for reading and moving data is cheaper because the next read operation can target a contiguous range of defragmented keys as opposed to performing multiple read operations to read the keys from various non-contiguous locations, thus reducing read amplification. Targeting a contiguous range of defragmented keys also reduces write amplification because the keys that will stay longer in the key-value store (e.g., keys within the lowest level of the log structured merge tree 208 have resided within the log structured merge tree 208 longer than keys within higher levels, and these keys within the lowest level are the keys being defragmented) are written together during the same timeframe, thus achieving defragmentation when writing the keys with a single write operation to a contiguous range of blocks. The defragmentation can be performed upon a container file used as a redirection layer for accessing the actual blocks in the distributed storage that comprise the keys. Because defragmentation is being performed upon the container file, defragmentation can be performed without interrupting client I/O accessing the blocks in the distributed storage.

Various embodiments of the present technology can also improve read and range read operations by reducing the amount of data being searched during a merge operation. In order to reduce the amount of data being searched during the merge operation, an in-memory hash is built. The in-memory hash includes in-memory hash entries for bins of keys within sorted logs of the log structured merge tree 208. The in-memory hash entries provide indications of starting locations of bins within the log structured merge tree 208. In some embodiments, an in-memory hash entry is built for a prefix of keys within a bin of a sorted log, and specifies the starting location of the bin within the log structured merge tree 208. Accordingly, when a search is performed to access a key or a range of keys having the prefix, the in-memory hash entry for the prefix is used to identify the starting location of the bin. In this way, the starting location can be used to directly access the bin without having to search the entire sorted log and/or the log structured merge tree 208. Directly accessing the bin reduces the time to search for particular keys or ranges of keys within the log structured merge tree 208. The in-memory hash entries can be built during a merge operation so that no extra traversal of the log structured merge tree 208 is needed, thus effectively reducing the overhead cost to build the in-memory hash entries to almost nothing.

Various embodiments of the present technology also improve garbage collection by prefetching keys that will be used during subsequent garbage collection rounds so that the keys are already cached within memory for faster access during processing. A predictive read ahead mechanism is implemented to predict what keys to prefetch, an amount of keys to prefetch, and/or a rate of prefetching keys. The predictive read ahead mechanism uses various criteria for predicting how to prefetch keys. The criteria may include storage latency (e.g., a latency corresponding to a time to access data within the distributed storage) and the time to perform a garbage collection round on a set of keys. The higher the storage latency, the more keys and/or the earlier the keys may be prefetched from storage of the distributed storage and cached into memory. The shorter the garbage collection round takes to complete, the more keys and/or the earlier the keys may be prefetched from the storage and cached into memory so that keys are readily available in memory. In this way, the efficiency of garbage collection is improved because keys are prefetched from the storage and cached ahead of time in fast memory for processing by garbage collection.

Various embodiments of the present technology also improve the efficiency of append log traversal of append logs within the log structured merge tree 208. Because append logs are not sorted, traversing the append logs to locate certain keys or ranges of keys is costly. In order to avoid traversing an entire append log when searching for a range of keys having a particular prefix, hashes are created so that only buckets of keys within an append log are searched based upon the buckets matching the prefix. Avoiding traversing the entire append log reduces the amount of data being searched because only the buckets matching the prefix are searched instead of the entire append log, thus improving the efficiency of searching the append log for certain keys. Avoiding traversing the entire append log is accomplished through the creation of hashes used to point to buckets associated with certain prefixes.

Figure 2:
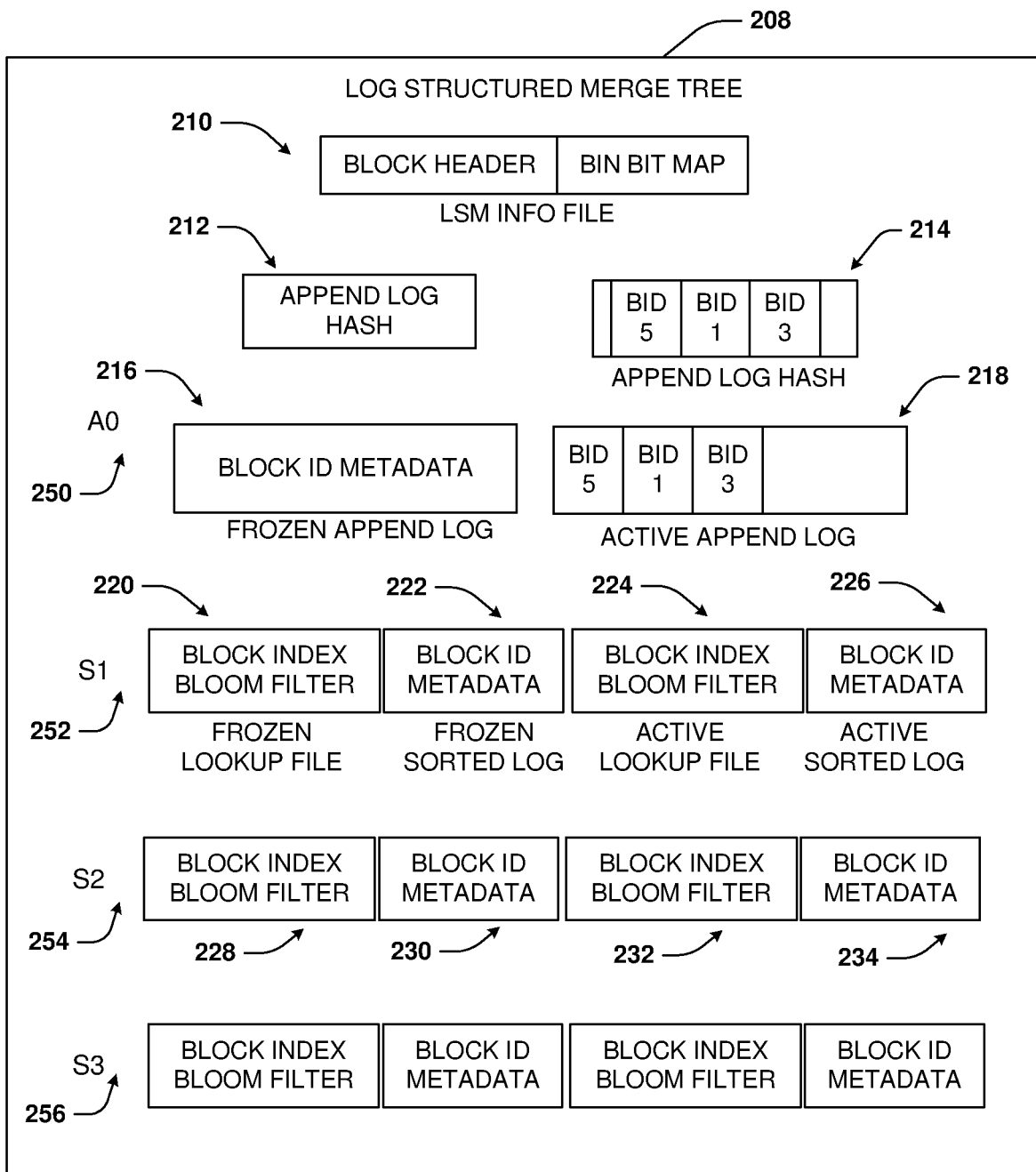
FIG. 2 is a block diagram illustrating an example a log structured merge tree in accordance with an embodiment of the present technology.

In some embodiments, keys of the key-value store 110 are stored within a log structured merge tree 208 of FIG. 2, which illustrates an example the log structured merge tree 208 in accordance with an embodiment of the present technology. The log structured merge tree 208 provides an efficient data structure for storing keys, sorting keys, and retrieving keys. The log structured merge tree 208 may be populated with keys of key-value pairs of the key-value store 110. In some embodiments, the keys inserted into the log structured merge tree 208 may correspond to block identifier metadata of virtual volume block numbers and physical volume block numbers corresponding to locations of values (value data items) within the distributed storage 106. In some embodiments, the log structured merge tree 208 comprises multiple levels within which the keys are stored within logs. The logs may include append logs and sorted logs. An append log is a data structure into which new keys may be initially stored. The keys initially inserted into an append log are not sorted. In contrast, keys may be subsequently sorted and stored into a sorted log that is a data structured used to store keys in a sorted manner. Over time as the append log becomes full, the keys may be re-compacted by a re-compaction process 112 by merging the keys down into lower levels of the log structured merge tree 208 using merge operations (e.g., keys within logs of a level S1 252 are merged down into logs of a level S2 254). In some embodiments, merging keys corresponds to moving keys from logs in one level of the log structured merge tree 208 into the same log in a lower level of the log structured merge tree 208 (e.g., keys from different logs in the upper level are moved (merged) together into the same log in the lower level). The keys may be merged down into sorted logs where the keys are sorted according to prefixes of the keys.

The log structured merge tree 208 may comprise a log structured merge tree info file 210 comprising a header block and a bin bit map. The log structured merge tree info file 210 may be a root block of the log structured merge tree 208 used to traverse down through the log structured merge tree 208. The log structured merge tree 208 may have a hierarchical tree structure of blocks where a top/root block is the log structured merge tree info file 210. The log structured merge tree 208 may comprise one or more append log hashes (e.g., an append log hash 212 and an append log hash 214) into which keys are may initially inserted. The log structured merge tree 208 comprises one or more append logs. The append logs include as a frozen append log 216 (e.g., an append log that has been frozen during a merge operation of the re-compaction process 112), an active append log 218, etc. The keys are initially put into the append log hash 214, and are then inserted into the active append log 218. As the active append log 218 becomes full, keys are merged down into sorted logs (e.g., S1-S3 as illustrated in FIG. 2) of the log structured merge tree 208 in a sorted manner by the re-compaction process 112. The keys correspond to hashes of values to which the keys are paired as key-value pairs. In this way, a key is a string that is a hash of a value. A prefix of a key is a particular number of starting characters of the string (e.g., the first 5 characters of the key or any other number of characters, a first byte of the key, etc.). The number of characters may be selected as a prefix such that keys paired with similar values will have the same prefix due to the keys being derived from hashes of the values (e.g., hashes of similar values may result in strings that have the same first byte of characters).

The log structured merge tree 208 may comprise one or more levels. The one or more levels include a level AO 250 of append logs, a level S1 252 of sorted logs, a level S2 254 of sorted logs, and a level S3 256 as a lowest level of sorted logs. Each level may comprise lookup files and/or sorted logs. For example, the level S1 252 comprises a frozen lookup file 220, a frozen sorted log 222, an active lookup file 224, and an active sorted log 226. The level S2 254 may comprise a frozen lookup file 228, a frozen sorted log 230, an active lookup file 232, and an active sorted log 234. Each lookup file may comprise a block index and a bloom filter used to locate sorted keys within the sorted logs. When a merge operation is performed upon logs and lookup files, the logs and lookup files are frozen so that the logs and lookup files are not modified until the merge operation is complete.

As a log becomes full, the re-compaction process 112 performs merge operations to merge keys of the log down to lower levels of the log structured merge tree 208 to free the log for storing new keys. Accordingly, a determination may be made as to whether a log (e.g., a sorted log of the log structure merge tree 208) is full. If the log is not, then keys will continue to be inserted into the log. If the log is a threshold amount full, then a merge operation is performed to merge keys of the log locate at a particular a level within the log structured merge tree 208 (e.g., active sorted log 226) with another log of a lower level within the log structured merge tree 208 (e.g., active sorted log 234). In some embodiments, merely the keys within the log are merged, and the values (value data items) associated with the keys are retained in an unmodified state (e.g., remain within the same data blocks) as part of the merge operation in order to reduce write amplification. That is, values can comprise variable sized amounts of data (e.g., 100 mb, 900 mb, etc.), which would be time consuming and resource intensive to read from a current location and write to a different location. Keys are much smaller than the values (e.g., 16 bytes), and thus it is much faster and less resource intensive to merely move the keys within a log than having to also move the values paired with the keys.

In some embodiments, value data items (e.g., data blocks comprising the value data items) may be defragmented in order to improve storage efficiency. The value data items, tracked by the key-value store 110, may be defragmented while retaining states of the sorted logs within the log structured merge tree 208. That is, because the value data items are stored separate from the keys, the value data items may be defragmented without modifying the keys. For example, a key can point to a virtual volume block number and physical volume block number of a file system, which can be updated to point to a new block location of a value data item after defragmentation without having to modify the key. Similarly, value data items can be compressed using a compression technique of the file system and/or compacted using a file system compaction technique of the file system in order to improve storage efficiency. The value data items can be compressed and/or compacted while retaining the states of the sorted logs within the log structured merge tree 208 because the key-value store 110 may be integrated into the file system and compression algorithms and/or compaction algorithms of the file system can be leveraged.

In some embodiments, value data items may be migrated from one location to another location while retaining the states of the sorted logs within the log structured merge tree 208. In some embodiments, a value data item may be migrated from one data block to another data block within a same storage device. In some embodiments, the value data item may be moved from one storage device to a different storage device. For example, a storage device locally attached to a worker node may be moved to another storage device locally attached to a different worker node. In some embodiments, the value data item may be moved from one storage provider (e.g., on-premise storage) to another storage provider (e.g., a cloud storage provider).

In some embodiments, data integrity checking functionality of the file system may be implemented for the key-value store 110. In an example, a data integrity checking operation may determine that a key within the key-value store is corrupt. The data integrity checking operation may be executed by the file system as part of a read operation to read the key of the key-value store 110. In response to the data integrity checking operation determining that the key is corrupt, the key may be recreated using a corresponding value data item stored in a data block separate from the key. For example, the key may be recreated from a content hash of the value data item. The data corruption of the key may not affect the value data item because the value data item is stored separate from the key.

An append log, a sorted log, a bloom filter (e.g., the pageable bloom filter), and/or a block index may be maintained as an on-disk data structures. A sorted file (e.g., the sorted log) has a lookup file that has a bloom filter and block index for the sorted log. The append log can be a frozen append log or an active append log that may be fronted by an in-memory hash. New writes are executed upon the active append log. When one append log reaches a threshold fullness and the other append log is empty, the append log that has reached the threshold fullness is frozen. An in-memory hash is created as part of an update to the active append log. Block identifiers (BIDs), metadata, virtual volume block numbers, and/or physical volume block numbers are stored in L1 indirect blocks of an append log, and value data items are stored into L0 direct blocks of the append log.

Read operations will look up an in-memory hash, where a key is a block identifier and a value is a file block number of an append log. Writes are executed upon the active append log, and are appended to an end of the active append log. Merge operations are performed on a frozen append log after an inode of the frozen append log is out of a consistency point and is not in the process of being flushed to the distributed storage. The consistency point is waited on to finish in order to obtain a virtual volume block number and/or physical volume block number in an L1 indirect block of an append log and user data in an L0 direct block of the append log. A frozen version and an active version of the sorted log and the lookup file may be maintained. Reads are executed upon a frozen version, and writes during a merge operation are directed to the active version. Block identifiers (BIDs), metadata, virtual volume block numbers, and/or physical volume block numbers are be stored in L1 indirect blocks of the sorted log, and value data items are stored within L0 indirect blocks of the sorted log. A merge operation merges frozen logs in level N and N+1 to an empty active log at N+1.

A put operation may be performed to put a key into the log structured merge tree 208. The put operation may be directed to a log structured merge tree 208 having a log structured merge tree hash. The put operation first performs a lookup in an active append log hash. If the key (e.g., a block identifier (BID)) exists, then a write of the put operation is skipped. If the key does not exist, then a look up to a frozen append log hash is performed. If the key (e.g., the block identifier (BID)) exists, then the write of the put operation is skipped. If the key does not exist, then a bloom filter chunk is traversed to ensure the key does not exist elsewhere. If the key does not exist, then a next entry within an append log is obtained for the write operation to store the key into the next entry. If memory used by the hashes exceeds a threshold, then the put operation is failed. Otherwise, the next entry is added into the active append log hash with a reference to point to the data of the put operation. Block identifier metadata is appended to an L1 indirect block of the append log as part of a consistency point, and the data is added to an L0 direct block. As part of the consistency point, a file system message is generated to have the file system point the L1 indirect block to a virtual volume block number and/or physical volume block number of the data. Once the active append log is full and another append log is empty, the active append log is frozen and subsequent writes are directed to the other append log that are active.

In some embodiments, an append log to sorted log merge operation may be performed. When an active append log reaches a threshold fullness, the active append log is frozen and is marked for merging. At the end of a consistency point where data if flushed to storage, log structured merge trees associated with a volume are checked to see if any of the log structured merge trees are marked for being merged. If a log structured merge tree is marked for being merged, then a procedure is performed to sort a frozen append hash by adding the frozen append hash to an in-memory map as an in-memory sorted map, and a message of such is provided to a file system.

The file system loads a frozen sorted log block, and iterates over an in-memory sorted map in order to merge entries in the frozen sorted log block and write the sorted entries in an active sorted log file. The file system updates a block index and bloom filter in an active lookup file. For each entry in the in-memory sorted map, the file system copies a block identifier (BID), a virtual volume block number, and a physical volume block number into a sorted log. If an entry in the in-memory sorted map has a delete marker, the merge operation will move the deleted entry to an active delete sorted log if the frozen sorted log has the block identifier. If the frozen sorted log does not have the block identifier, then the block identifier is added to the active sorted log with a delete marker.

In some embodiments, a sorted log merge operation is performed. When a current level sorted log reaches a threshold fullness, a merge to a next level sorted log is triggered. Frozen sorted log blocks are loaded from the current level sorted log and the next level sorted log. Entries of the loaded frozen sorted blocks are merged and written to a next level active sorted log. A block index and bloom filer in an active lookup file are updated. If an entry is marked for deletion and the next level frozen sorted log has a block identifier of the entry, then the entry is added to an active delete sorted log and is not written to the active sorted log. The active delete sorted log is truncated at the end of the sorted log merge operation. If the entry is not found in the next level frozen sorted log, then a delete marker entry is written to the active sorted log.

In some embodiments of improving the operation of the key-value store 110 and the log structured merge tree 208, the first worker node 104 implements the re-compaction process 112 and a defragmentation process 114. The defragmentation process 114 defragments keys within a lowest level of the log structured merge tree 208 (e.g., the level S3 256) during a last merge operation performed by the re-compaction process 112. Defragmenting keys reduces read and write amplification because keys with the same prefix (e.g., the same first 2 bytes of 16 byte keys) are stored and retrieved together from the same contiguous range of blocks within the distributed storage 106. Operation of the defragmentation process 114 will be further described in relation to FIGS. 3 and 4.

In some embodiments of improving the operation of the key-value store 110 and the log structured merge tree 208, the first worker node 104 implements a garbage collection process 116 and a predictive read ahead mechanism 118. The predictive read ahead mechanism 118 is implemented to prefetch keys from the distributed storage 106 and cache the keys in memory so that the keys are readily available in the faster memory for processing by the garbage collection process 116. Operation of the garbage collection process 116 and the predictive read ahead mechanism 118 will be further described in relation to FIGS. 5 and 6.

In some embodiments of improving the operation of the key-value store 110 and the log structured merge tree 208, the first worker node 104 implements a hash building process 120. The hash building process 120 is performed to build in-memory hash entries used to identify starting locations of bins within the log structured merge tree 208 so that key access requests can start searching for keys from the start locations of the bins instead of searching the entire log structured merge tree 208 or entire logs of the log structured merge tree 208. Operation of the hash building process 120 will be further described in relation to FIGS. 7 and 8.

In some embodiments of improving the operation of the key-value store 110 and the log structured merge tree 208, the first worker node 104 implements an append hash building process 122. The append hash building process 122 builds and utilizes hashes to avoid searching an entire append log (e.g., performing a costly binary search of an unsorted append log) when searching for keys having a particular prefix because the hashes can be used to locate a bucket within the append log that corresponds to keys having the prefix, and thus only the bucket within the append log is searched. Operation of the append hash building process 122 will be further described in relation to FIGS. 9 and 10.

Figure 3:
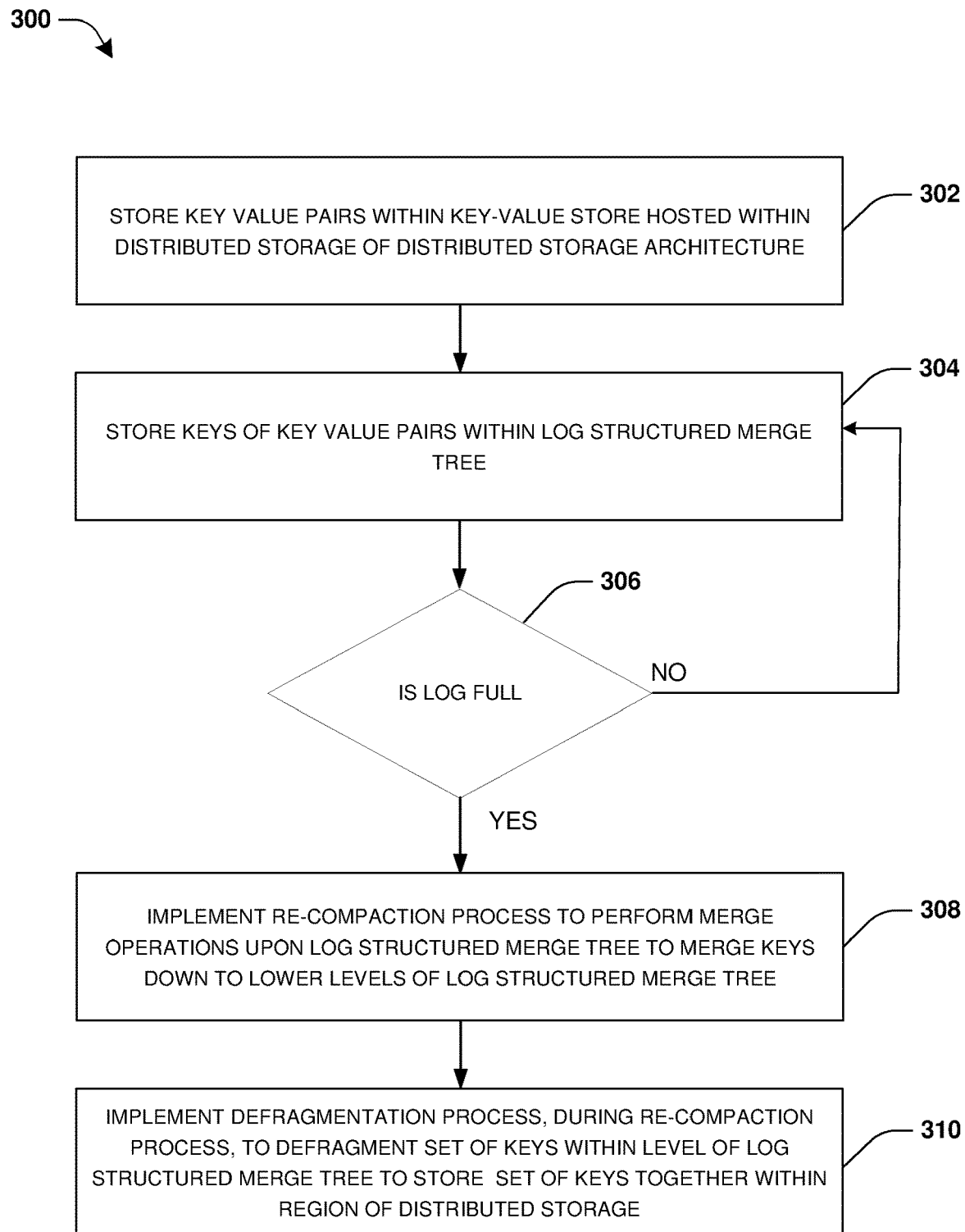
FIG. 3 is a flow chart illustrating an example of a set of operations for implementing a defragmentation process during a re-compaction process of a log structured merge tree in accordance with various embodiments of the present technology.
Figure 4:
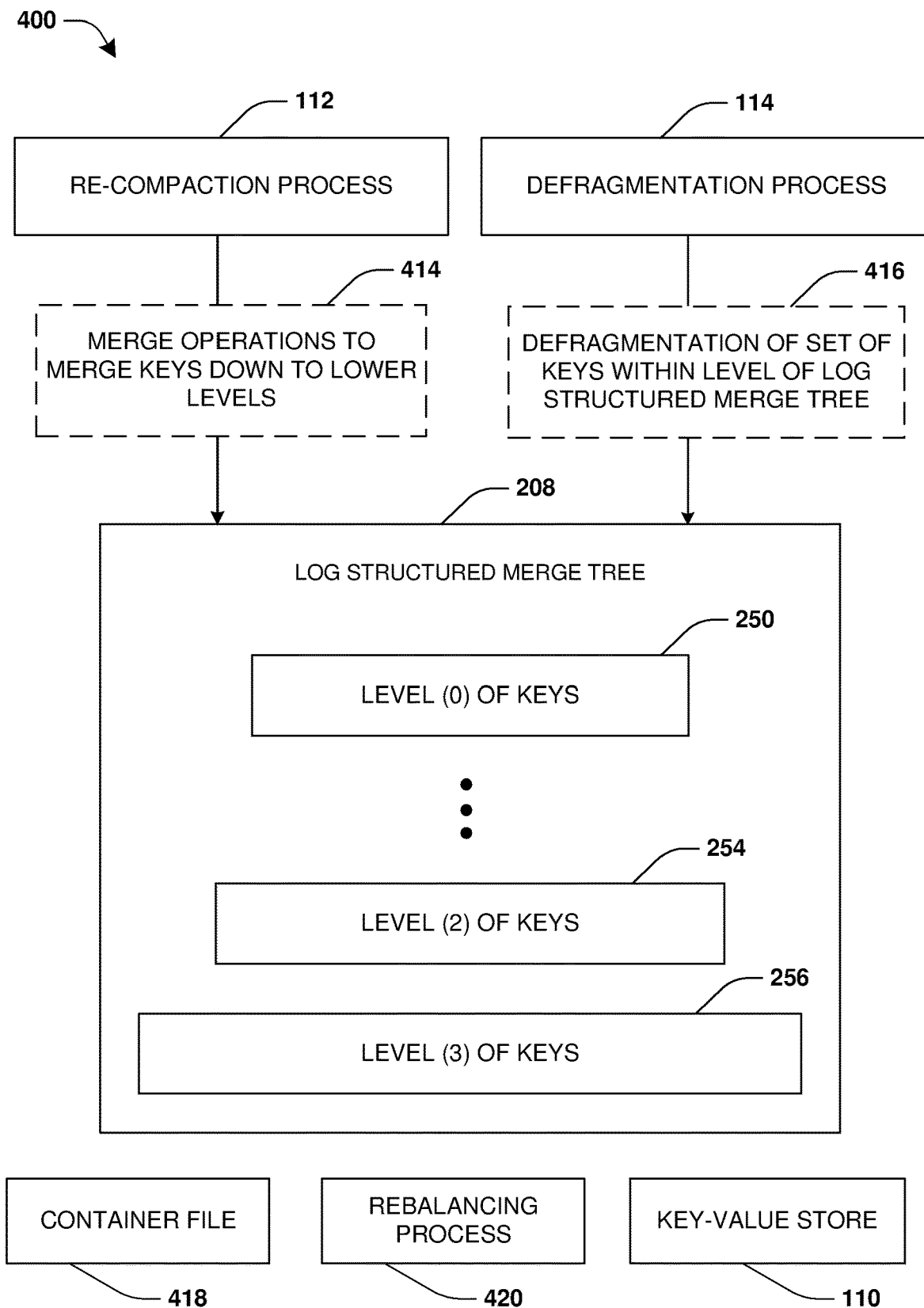
FIG. 4 is a block diagram illustrating an example of implementing a defragmentation process during a re-compaction process of a log structured merge tree in accordance with an embodiment of the present technology.

FIG. 3 is a flow chart illustrating an example of a set of operations for implementing the defragmentation process 114 during the re-compaction process 112 of the log structured merge tree 208 in accordance with various embodiments of the present technology. The example of FIG. 3 is discussed in conjunction with FIG. 4 that shows a block diagram illustrating an example of implementing the defragmentation process 114 during the re-compaction process 112 of the log structured merge tree 208 in accordance with an embodiment of the present technology.

The key-value store 110 is used to store key-value pairs, during operation 302, of method 300. A key value pair includes a key and a value (a value data item). The value may comprise any type of data, which may include a block of data, a file, a variable sized blob of data, etc. A content hashing function, such as a cryptographic hashing function, may take the value as an input in order to output a content hash as the key. In some embodiments, a value may comprise a 10 mb text document. A content hashing function may take the 10 mb text document as an input, and will output a content hash that is a hash of the content of the 10 mb text document. The hash may be 16 bytes or any other size, and is unique to the content of the 10 mb text document. The hash may be a string of characters selected based upon the content of the 10 mb text document. Thus, the key is based upon the content of the value, and thus is unique to the value. In this way, the key may be used to identify and reference the value. The value may be stored within the distributed storage 106 separate from the key. The key may be stored within the log structured merge tree 208, during operation 304 of method 300. The key may comprise a prefix, such as where the key is 16 bytes and the first 2 bytes of the key is the prefix of the key (e.g., the first 2 bytes of the 16 total bytes of the key is referred to/designated as the prefix of the key). Keys may be assigned to bins based upon the prefixes of the keys. In some embodiments, keys with the same prefix are stored within the same bin. The keys and bins may be stored within append logs and sorted logs within the various levels of the log structured merge tree 208. These levels may include the level AO 250 of append logs, the level S1 252 of sorted logs, the level S2 254 of sorted logs, and the level S2 256 as the lowest level of sorted logs.

If a log such becomes full (e.g., 90% full of keys with only 10% remain storage for storing new keys), then the re-compaction process 112 is implemented. Otherwise, keys will continue to be inserted into the log of the log structured merge tree 208. In this way, a determination is made to as whether the log is full, during operation 306 of method 300. If the log becomes full, then the re-compaction process 112 is triggered to perform one or more merge operations 414 to merge keys down to lower levels of the log structured merge tree 208, during operation 308 of method 300. In some embodiments, the re-compaction process 112 takes keys within the full log and performs a merge operation to sort the keys according to prefixes of the keys and stores the sorted keys down into logs (e.g., sorted logs) within a level below the level of the full log. These merge operations may be performed for logs starting at the top level of the log structured merge tree 208 (level AO 250) down to a last/bottom level of the log structured merge tree (level S2 256).

During a last merge operation that sorts and merges keys down into logs of the last/bottom level of the log structured merge tree 208 (level S2 256), the defragmentation process 114 is executed, during operation 310 of method 300. In some embodiments, the defragmentation process 114 is either triggered or skipped based upon an amount of fragmentation of keys within the log structured merge tree 208. Since the defragmentation process consumes resources, defragmentation may be triggered if the amount of fragmentation of the keys exceeds a threshold (e.g., a percentage of keys are stored in fragmented locations within the distributed storage 106), otherwise defragmentation is not performed so that resources are not needlessly wasted.

The defragmentation process 114 defragments 416 keys within the last level of the log structured merge tree 208 so that keys with the same or similar prefixes are stored together within the same region of the distributed storage 106 (e.g., stored within contiguous blocks of storage of the distributed storage 106). In some embodiments, the defragmentation process 114 is selectively implemented upon the last level of the log structured merge tree 208 because the last level includes keys that have longer lifespans within the distributed storage 106 then keys within higher levels of the log structured merge tree 208. In this way, the defragmentation process 114 defragments keys that will be stored within the distributed storage 106 for a long period of time (e.g., keys that will remain after the re-compaction process 112 completes), instead of wasting resources defragmenting short lived keys that will be deleted quickly (e.g., some keys may be deleted before the re-compaction process 112 completes).

In some embodiments, the defragmentation process 114 modifies physical volume block numbers pointing to blocks within the distributed storage 106 that store the keys being defragmented. The defragmentation process 114 refrains from modifying virtual volume block numbers representing locations of the blocks within the distributed storage 106. In some embodiments, the defragmentation process 114 defragments keys without modifying a sorted log within which the keys are sorted within the log structured merge tree 208. In some embodiments, the defragmentation process 114 is implemented upon a container file 418. The container file 418 is implemented as a redirection layer for accessing the keys within the distributed storage 106. The container file 418 comprises physical volume block numbers that point to the location of the keys within the distributed storage 106. In this way, the defragmentation process 114 modifies the physical volume block numbers to point to the defragmented locations of the keys within the distributed storage 106. Because the defragmentation process 114 modifies the container file 418 but may not modify user blocks of values within the distributed storage that contain values referenced by the keys, I/O operations targeting the values of the key-value pairs can be executed during the defragmentation process 114.

In some embodiments, the defragmentation process 114 may be performed during a rebalancing process 420. The rebalancing process 420 may be performed to rebalance keys across bins of the distributed storage 106 based upon prefixes of the keys. In some embodiments, the keys may be rebalanced across the bins so that similar amounts of keys are stored within each bin and no bin stores a disproportionate amount more of keys than other keys. In some embodiments, the rebalancing process 420 may move keys from a bin managed by an overburdened worker node to a bin of a worker node that has more free resources to managing the keys. The defragmentation process 114 may be performed during a first prefixed based movement operation of the rebalancing process 420 to defragment keys being redistributed across bins of the worker nodes in order to store sets of keys having the same prefixes together in the distributed storage, thus achieving defragmentation. In this way, a subsequent prefixed based movement operation can read the defragmented keys together in an efficient manner because the keys with the same prefixed targeted by the subsequent prefixed based movement operation are stored together in the distributed storage.

Figure 5:
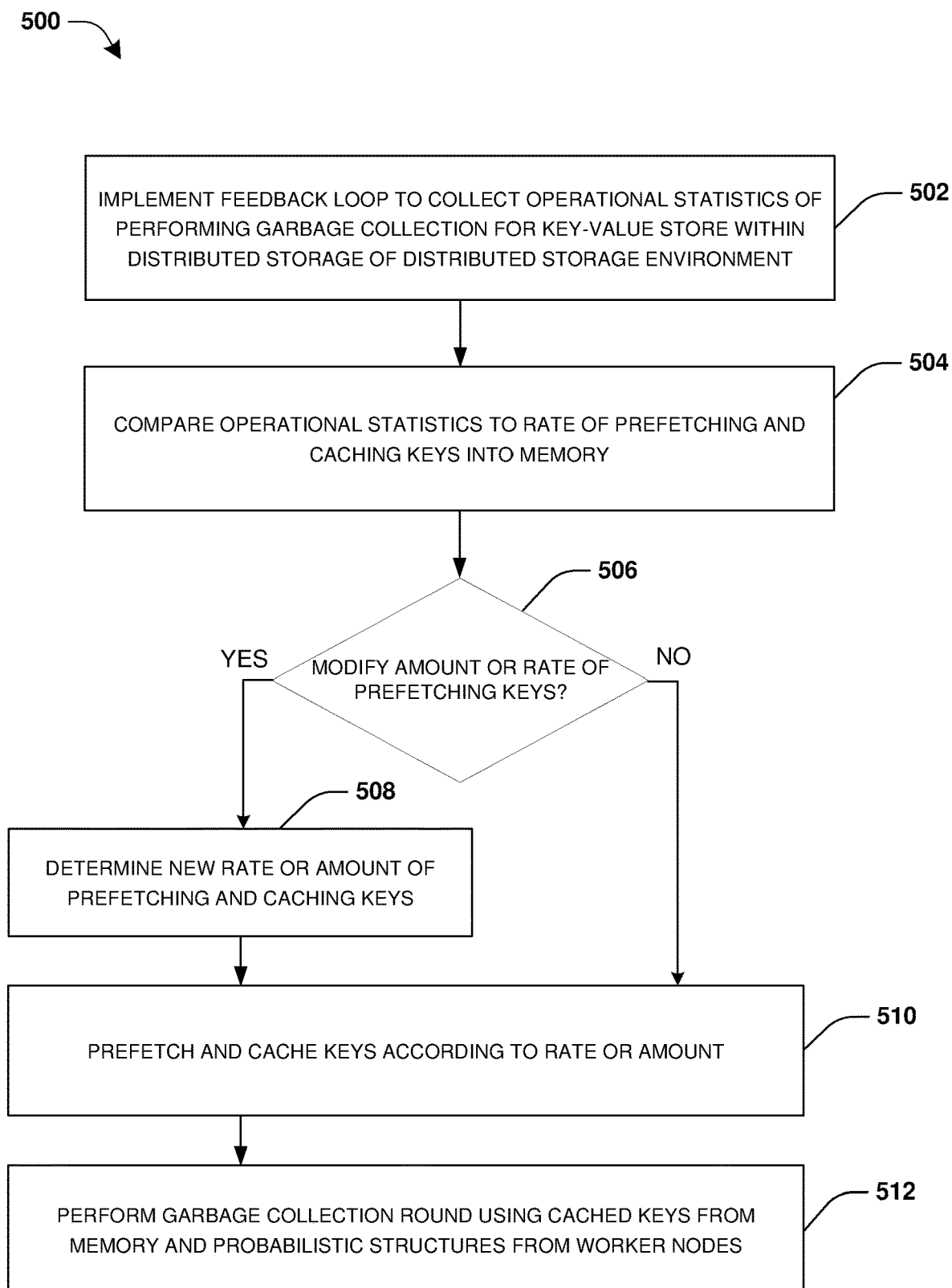
FIG. 5 is a flow chart illustrating an example of a set of operations for prefetching and caching keys for use during a garbage collection round of a garbage collection process in accordance with various embodiments of the present technology.
Figure 6:
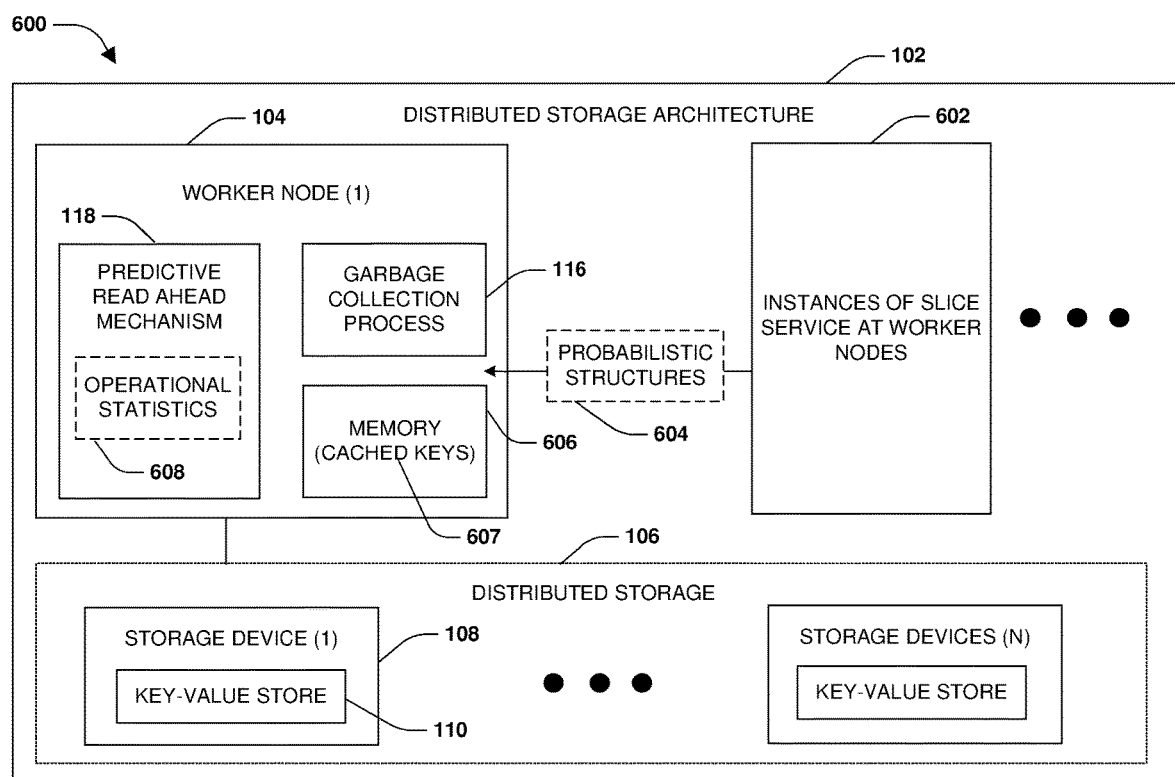
FIG. 6 is a block diagram illustrating an example of prefetching and caching keys for use during a garbage collection round of a garbage collection process in accordance with various embodiments of the present technology.

FIG. 5 is a flow chart illustrating an example of prefetching and caching keys for use during a garbage collection round of a garbage collection process 116 in accordance with various embodiments of the present technology. The example of FIG. 5 is discussed in conjunction with FIG. 6 that shows a block diagram illustrating an example of prefetching and caching keys for use during a garbage collection round of a garbage collection process 116 in accordance with various embodiments of the present technology.

The first worker node 104 may implement a garbage collection process 116 to identify unused blocks (e.g., keys, values, and/or key-value pairs) and free the unused blocks for storing other data/information. If a key is no longer referenced by any worker node in the distributed storage architecture 102, then the key can be freed from the distributed storage 106. In order to determine whether any of the worker nodes reference the key, slice services 602 at each worker node generate probabilistic structures 604 (e.g., bloom filters) that are indicative of in-use keys of the worker nodes. The slice services 602 send the probabilistic structures 604 to block services of the worker nodes for use in performing garbage collection. A block service of the first worker node 104 may manage bins of keys owned by the first worker node 104. The keys may be tracked within the log structured merge tree 208. The block service may implement the garbage collection process 116 to perform a plurality of garbage collection rounds to compare the probabilistic structures 604 (e.g., the latest probabilistic structures received from the slice services 602) to sets of keys tracked within the log structured merge tree 208 in order to identify keys tracked within the log structured merge tree 208 but not occurring within the probabilistic structures 604. These keys are unused keys that can be freed and used to store other data.

In some embodiments, a bloom filter is used as a probabilistic structure. A base data structure of the bloom filter is a bit vector. The bit vector initially comprises a row of empty cells each represented by a bit, and a row of index values for the empty cells (e.g., index value 0 to cell 1, index value 1 for cell 1, etc.). To add an element (e.g., an in-use key) into the bloom filter, the element is hashed one or more times, and bits in the bit vector are set to 1 at the index values of those hashes.

The first worker node 104 may implement the predictive read ahead mechanism 118 to dynamically prefetch keys from the distributed storage 106 and cache the keys within memory 606 as cached keys 607 in order to increase the speed and efficiency of the garbage collection process 116 due to the cached keys 607 being in faster memory 606 than the storage devices of the distributed storage 106. The amount of keys to prefetch and cache and/or the rate and timing of prefetching keys may be based upon various factors, such as the latency of prefetching keys from the storage devices of the distributed storage 106 and/or the time to validate probabilistic structures 604. Validating the probabilistic structures 604 may include receiving the probabilistic structures 604, comparing the probabilistic structures 604 to the cached keys 607, and freeing any unused keys. The factors may be determined based upon operational statistics 608 collected by the predictive read ahead mechanism 118. The operational statistics 608 may be collected a through a feedback loop used to monitor the garbage collection process 116 and/or storage latency of the storage devices within the distributed storage 106.

During operation 502 of method 500, the predictive read ahead mechanism 118 implements the feedback loop to collect the operational statistics 608 associated with the garbage collection process 116, disk access, and/or other components and processes of the distributed storage architecture 102. In some embodiments, the feedback loop is used to monitor storage latency of the storage devices as the operational statistics 608. If the storage latency is higher than a threshold, then more keys may be prefetched in a batch. By the time the batch of keys is processed by a garbage collection round implemented by the garbage collection process 116, then a next batch of key will have been prefetched and cached within the memory 606. The keys to prefetch may be determined based upon how many keys (blocks) will be processed in a timeframe (e.g., a second) and how long it takes to prefetch the keys from the distributed storage. In some embodiments, the feedback loop is used to monitor the rate of receiving and/or validating the probabilistic structures 604 as the operational statistics 608. The rate of validating (processing) the probabilistic structures 604 may be tracked in combination with the storage latency. The rate of validating the probabilistic structures 604 and the storage latency is used to determine how early to prefetch keys so that the keys are readily available in the memory 606 for being processed by a garbage collection round. The keys may be prefetched in batches to avoid issuing too many prefetch read operations to the storage devices of the distributed storage 106.

In some embodiments, the feedback loop may be used to monitor the rate of delete operations being performed as the operational statistics 608. Such delete operations may result in unused keys (garbage) to collect by the garbage collection process 116 and/or the deletion of such keys by the garbage collection process 116. Garbage collection involves obtaining the keys owned by the first worker node 104, determining whether those keys match the probabilistic structures 604, and freeing any unused keys (keys not matching the probabilistic structures 604) using the delete operations. Obtaining the keys is the only part of garbage collection that involves accessing the storage devices (HHDs, SSDs, NVMe, flash storage, etc.) of the distributed storage 106. The total cost of the garbage collection workflow, which includes execution of the delete operations to free the unused keys, is used to create a prediction as to the rate (how fast) keys should be prefetched and cached into the memory 606 so that the keys are readily available for the garbage collection process 116.

It may be appreciated that a variety of different operational statistics 608 may be collected and used to determine the rate and amount of keys to prefetch and cache. The operational statistics 608 may include an amount of unused keys being garbage collected, access patterns of the key-value store 110, a fullness of the key-value store 110, a timespan between garbage collection rounds performed upon sets of keys, a total time to complete a garbage collection round, and/or other factors that may affect the rate of garbage collection (e.g., the rate of garbage collection rounds may be increased or decreased based upon the fullness of the key-value store 110). In some embodiments, if the garbage collection process 116 is waiting longer for a range get operation to obtain a range of keys of a bin to garbage collect, then keys may be prefetch from more than one bin so that more keys will be prefetched and cached. Additionally, a prefetch window for prefetching and caching keys may be dynamically increased until the range get operations are no longer waiting for read operations to obtain keys for garbage collect because the keys are now all cached in the memory 606.

Once the operational statistics 608 are collected, the operational statistics 608 may be compared to a current rate (e.g., the prefetch window between prefetching sets of keys to cache) and/or amount (e.g., prefetching keys within a single bin, multiple bins, etc.) of prefetching and caching keys into the memory 606 in order to select/predict an amount and/or rate of keys to prefetch and cache, during operation 504 of method 500. In some embodiments, the operational statistics 608 correspond to a timespan between two consecutive garbage collection rounds, which is indicative of how long a garbage collection round takes to complete in order for a next garbage collection round to execute. If the rate of prefetching and caching keys is slower than the time for a garbage collection round to complete, then there will be no cached keys for the next garbage collection round because the keys have not yet been prefetched and cached. In this way, the rate of prefetching and caching the keys is increased.

During operation 506 of method 500, a determination may be made as to whether a current amount and/or rate of prefetching keys corresponds to the selected/predicted amount and/or rate of keys to prefetch and cache as determined based upon the operational statistics 608. That is, the operational statistics 608 may change over time, and thus the amount and/or rate of prefetching keys may be dynamically adjusted. In some embodiments, if the storage latency of accessing the storage devices exceeds a threshold, then a larger amount of keys may be selected for a next garbage round and/or the rate of prefetching keys may be increased. In some embodiments, if the rate at which the probabilistic structures are being validated (e.g., received and/or compared to keys owned by the first worker node) exceeds a threshold, then a larger amount of keys may be selected for a next garbage round and/or the rate of prefetching keys may be increased. In some embodiments, if the rate at which delete operations are being completed (e.g., delete operations to free unused keys) exceeds a threshold, then a larger amount of keys may be selected for a next garbage round and/or the rate of prefetching keys may be increased. If the current amount or rate of prefetching keys is to be modified, then a new rate and/or amount may be determined, during operation 508 of method 500.

During operation 510 of method 500, a set of keys may be prefetched from the storage devices of the distributed storage 106 accordingly the amount and/or rate (current amount/rate or new amount/rate if modified). The prefetched keys are cached within the memory 606 as the cached keys 607 readily available for a next garbage collection round performed by the garbage collection process 116. During operation 512 of method 500, the next garbage collection round is performed to compare the cached keys 607 to the latest probabilistic structures 604 received from the slice services 602. If any of the cached keys 607 do not match any probabilistic structures 604, then the cached keys 607 are unused keys that are freed/deleted.

In some embodiments, a keyspace of keys of the key-value store 110 may span multiple log structured merge trees. The keys may be distributed into the log structured merge trees based upon prefixes of the keys (e.g., a prefix is the first 2 bytes of a 16 byte key). Each log structured merge tree has 3 levels of sorted logs (e.g., level S1 252, level S2 254, and level S3 256 of the log structured merge tree 208). A bin is the 2 byte prefix, and thus keys with the same 2 byte prefix are grouped into the same bin assigned that 2 byte prefix. There is a bin hash that indicates where in the log structured merge tree that these keys of the bin start. Since data (keys) stored in the log structured merge tree is based on content hashes, each bin will have an equal number of entries (keys). Knowing the total space of the log structured merge tree 208 helps to determine a size of a bin within a log. Based upon the prefix, read operations may be issued to exact locations of keys in the distributed storage in order to prefetch the keys (blocks) into the memory 606. Based upon the time taken by garbage collection process 116, a time at which a next set of keys are to be prefetched can be determined. In this way, prefetching and caching of keys is dynamic in nature.

Figure 7:
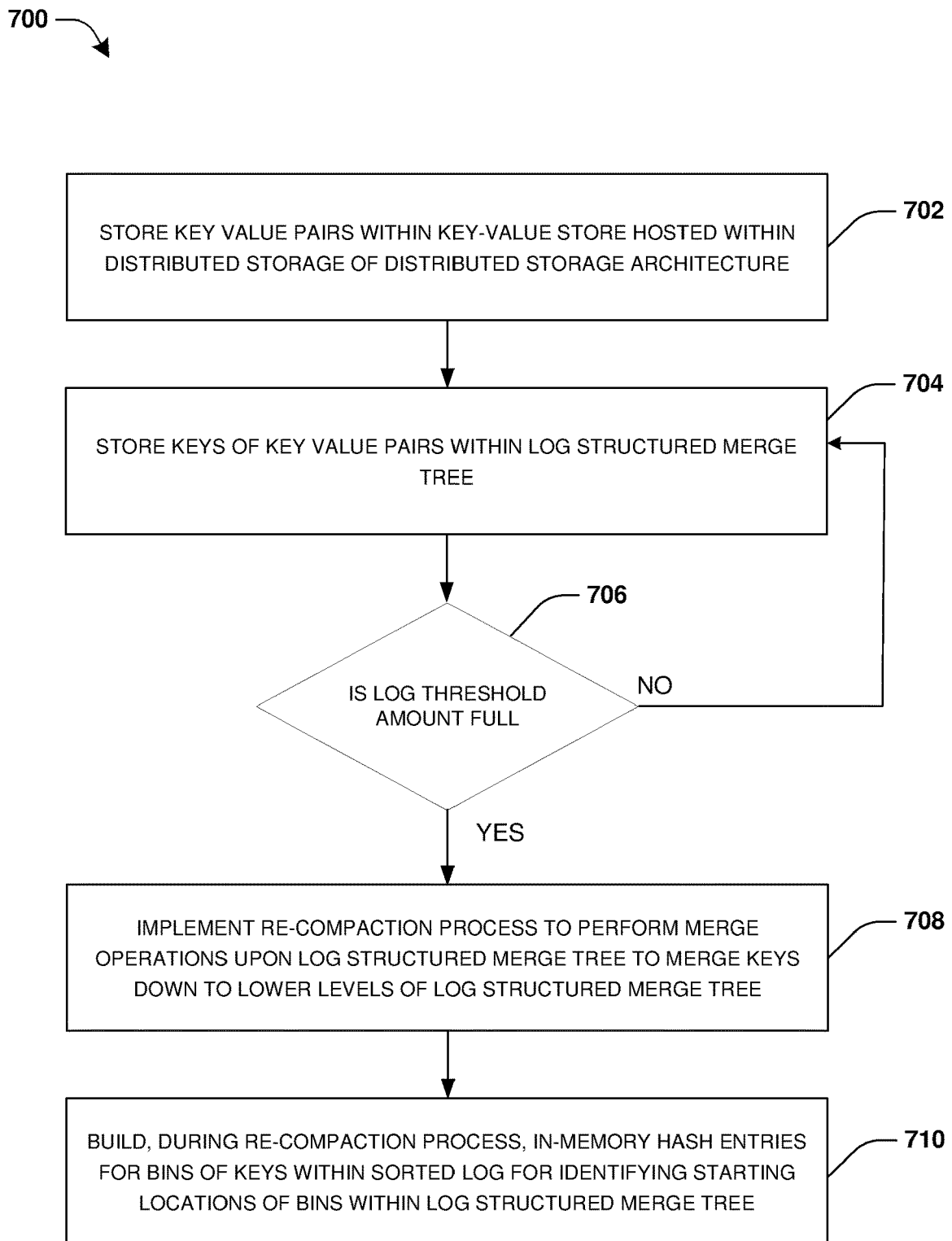
FIG. 7 is a flow chart illustrating an example of a set of operations for building in-memory hash entries during a re-compaction process in accordance with various embodiments of the present technology.
Figure 8:
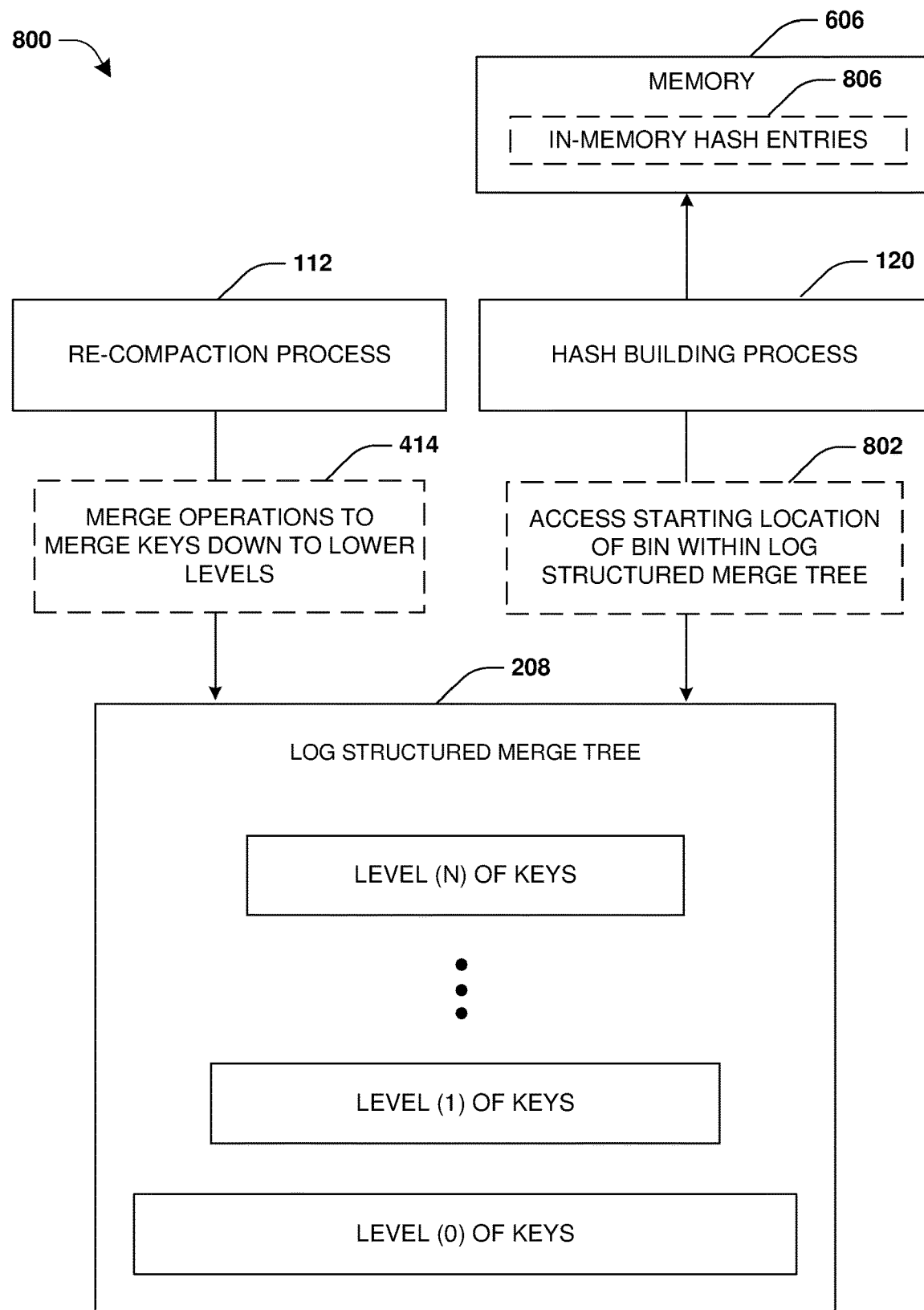
FIG. 8 is a block diagram illustrating an example of building in-memory hash entries during a re-compaction process in accordance with various embodiments of the present technology.

FIG. 7 is a flow chart illustrating an example of a set of operations for building in-memory hash entries during a re-compaction process in accordance with various embodiments of the present technology. The example of FIG. 7 is discussed in conjunction with FIG. 8 that shows a block diagram illustrating an example of building in-memory hash entries during a re-compaction process in accordance with various embodiments of the present technology.

The key-value store 110 is used to store key-value pairs, during operation 702, of method 700. A key value pair includes a key and a value (a value data item). The value may comprise any type of data, which may include a block of data, a file, a variable sized blob of data, etc. A content hashing function, such as a cryptographic hashing function, may take the value as an input in order to output a content hash as the key. Thus, the key is based upon the content of the value, and thus is unique to the value. In this way, the key may be used to identify and reference the value. The value may be stored within the distributed storage 106 separate from the key. The key may be stored within the log structured merge tree 208, during operation 704 of method 700. The key may comprise a prefix, such as where the key is 16 bytes and the first 2 bytes is the prefix of the key. Keys may be assigned to bins based upon the prefixes of the keys. In some embodiments, keys with the same prefix are stored within the same bin. The keys and bins may be stored within append logs and sorted logs within the various levels of the log structured merge tree 208. These levels may include the level AO 250 of append logs, the level S1 252 of sorted logs, the level S2 254 of sorted logs, and the level S2 256 as the lowest level of sorted logs.

If a log becomes full (e.g., 90% full of keys with only 10% remain storage for storing new keys), then the re-compaction process 112 is implemented. Otherwise, keys will continue to be inserted into the log of the log structured merge tree 208. In this way, a determination is made to as whether the log is full, during operation 706 of method 700. If the log becomes full, then the re-compaction process 112 is triggered to perform one or more merge operations 414 to merge keys down to lower levels of the log structured merge tree 208, during operation 708 of method 700. In some embodiments, the re-compaction process 112 takes keys within the full log and performs a merge operation to sort the keys according to prefixes of the keys and store the sorted keys down into logs (e.g., sorted logs) within a level below the level of the full log. These merge operations may be performed for logs starting at the top level of the log structured merge tree 208 (level AO 250) down to a last/bottom level of the log structured merge tree (level S2 256).

During performance of a merge operation by the re-compaction process 112, in-memory hash entries 806 are built and stored within the memory 606 by the hash building process 120, during operation 710 of method 700. An in-memory hash entry may be built for a bin of keys (e.g., keys having a particular prefix may be grouped into the bin based upon the bin being assigned that prefix). The in-memory hash entry identifies a starting location of the bin within the log structured merge tree 208 (e.g., a starting location of the bin within a log of the log structured merge tree 208). Thus, instead of searching the entire log, which could be an unsorted append log with unsorted keys that would require an expensive and time consuming binary search, the in-memory hash entry can be used to directly access the bin in order to merely search the bin for a particular key or range of keys.

In some embodiments, the in-memory hash entry is built for a 2 byte prefix of a key within the bin. The in-memory hash entry has a value per level of the log structured merge tree 208 of where the two byte prefix of the key (the bin) starts within the log structured merge tree 208. In some embodiments, the hash building process 120 generates hash indexes per level of the log structured merge tree 208. A hash index may indicate a prefix of where a sorted log starts within the log structured merge tree 208. In some embodiments, the in-memory hash entries 806 may be built during the merge operations 414 by using the result of I/O operations performed by the merge operation to create the in-memory hash entries without consuming additional resources, thus making the hash building process 120 cheap (low resource consumption). In some embodiments, in-memory hash entries may be created and/or updated in-line when writing keys to sorted logs within the log structured merge tree 208. If a key and/or bin comprising the key is merged down and written to a sorted log in a lower level of the log structured merge tree 208, then an in-memory hash entry for the key and/or bin is updated with a new starting location in the lower level.

In some embodiments, a request to access a key within a bin may be received. The key may have a prefix assigned to the bin, and thus the key is grouped into the bin. In this way, the prefix of the key being requested can be used to identify the bin to which the key is grouped. An in-memory lookup directed to the in-memory hash entries 806 within the memory 606 is performed to identify an in-memory hash entry associated with the prefix of the key. The in-memory hash entry specifies a starting location of the bin within the log structured merge tree 208. In this way, the starting location is used to access 802 the starting location of the bin for locating the key. In this way, merely the bin is searched for the key instead of the entire log structured merge tree 208 and/or an entire log within which the bin is located. In some embodiments, the in-memory hash entries may be used during a subsequent merge operation to efficiently locate keys within logs of the log structured merge tree 208 for merging the keys. The in-memory hash entries may be used for a rebalancing operation that redistributes keys across worker nodes and storage devices of the distributed storage architecture 102. The rebalancing operation can use the in-memory hash entries to more quickly locate keys to redistribute.

Figure 9:
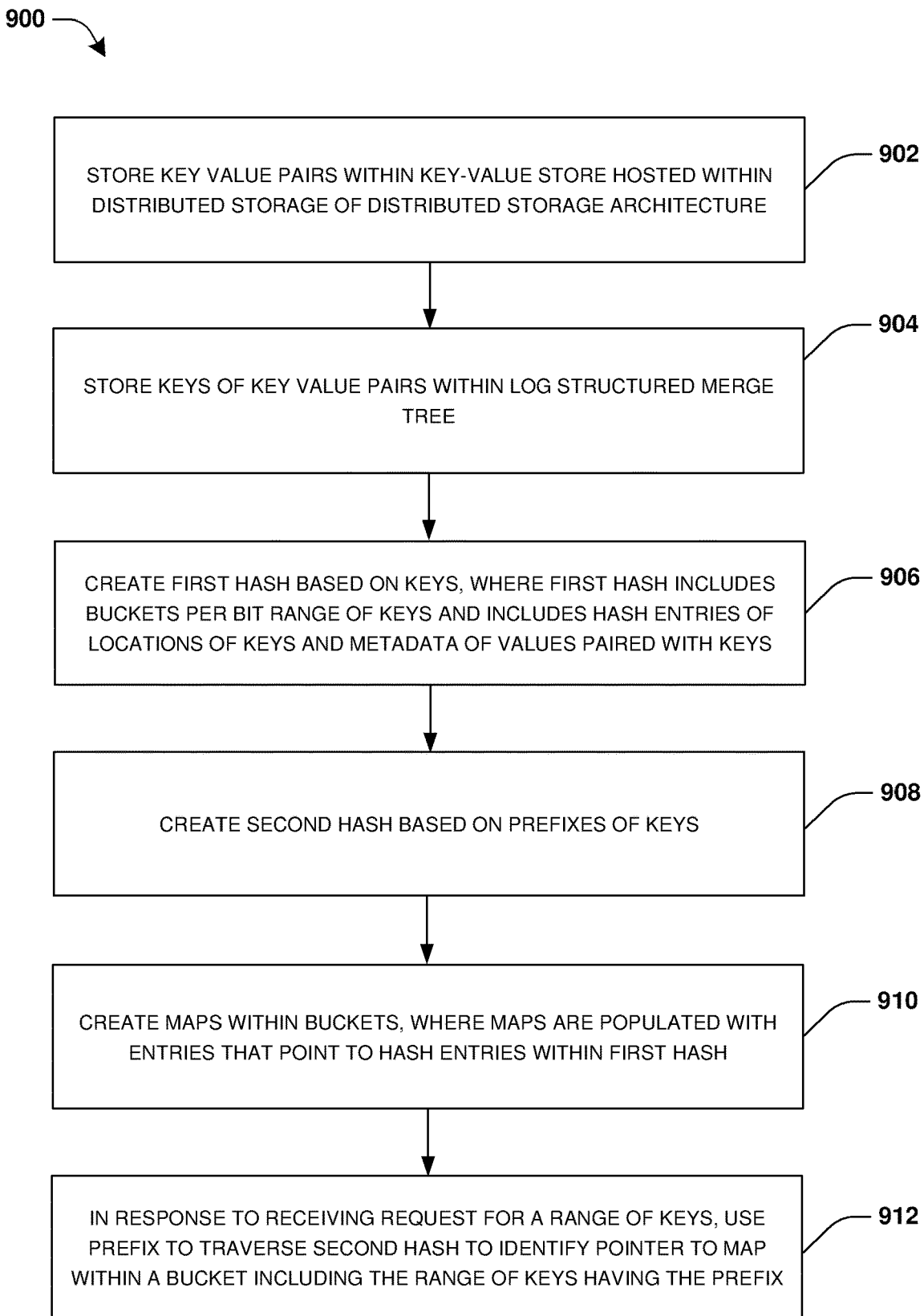
FIG. 9 is a flow chart illustrating an example of a set of operations for creating hashes for locating ranges of keys of a key-value store in accordance with various embodiments of the present technology.
Figure 10:
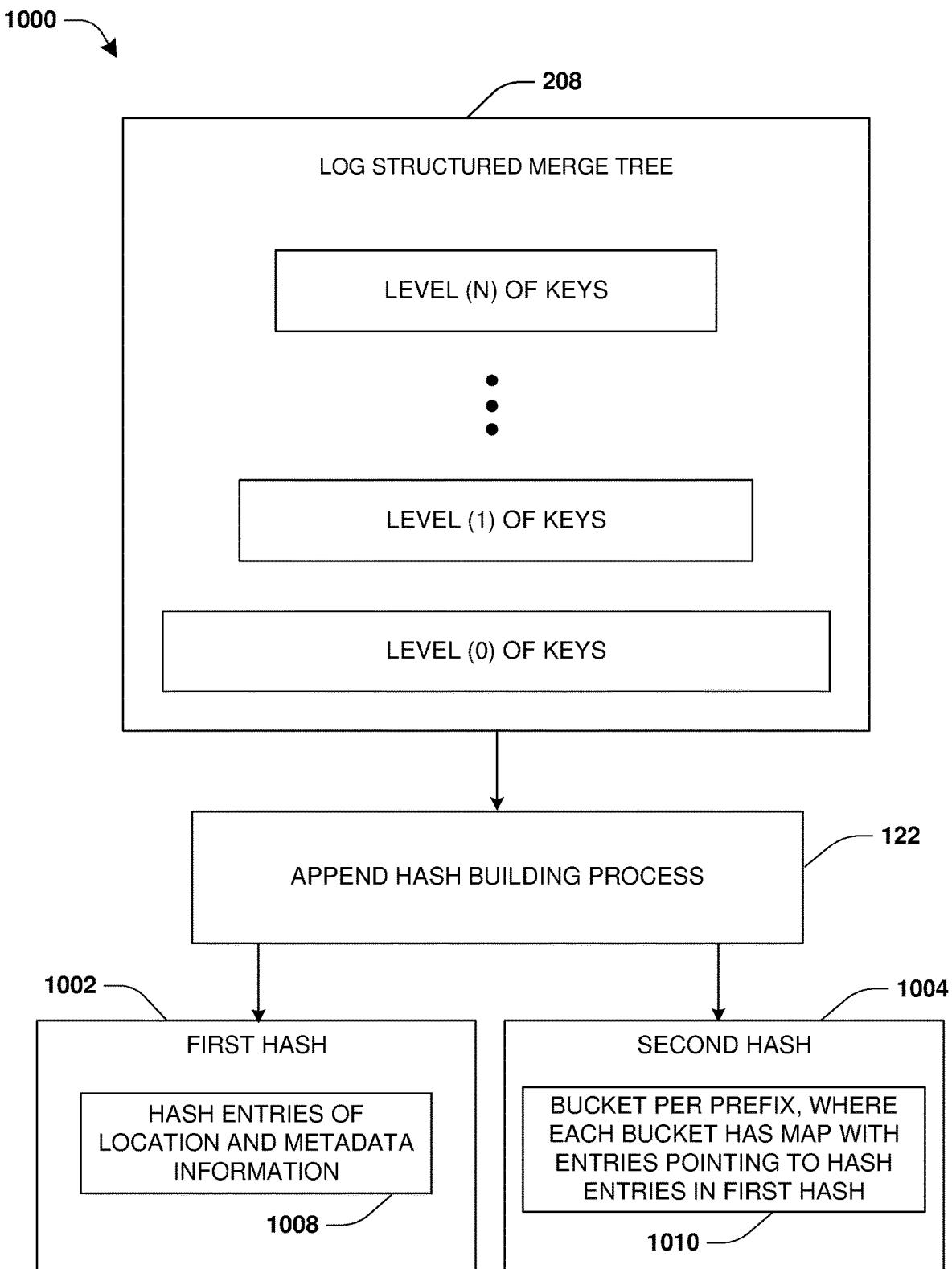
FIG. 10 is a block diagram illustrating an example of creating hashes for locating ranges of keys of a key-value store in accordance with various embodiments of the present technology.

FIG. 9 is a flow chart illustrating an example of creating hashes for locating ranges of keys of a key-value store in accordance with various embodiments of the present technology. The example of FIG. 9 is discussed in conjunction with FIG. 10 that shows a block diagram illustrating an example of creating hashes for locating ranges of keys of a key-value store in accordance with various embodiments of the present technology.

The key-value store 110 is used to store key-value pairs, during operation 902, of method 900. A key value pair includes a key and a value (a value data item). The value may comprise any type of data, which may include a block of data, a file, a variable sized blob of data, etc. A content hashing function, such as a cryptographic hashing function, may take the value as an input in order to output a content hash as the key. Thus, the key is based upon the content of the value, and thus is unique to the value. In this way, the key may be used to identify and reference the value. The value may be stored within the distributed storage 106 separate from the key. The key may be stored within the log structured merge tree 208, during operation 904 of method 900. The key may comprise a prefix, such as where the key is 16 bytes and the first 2 bytes is the prefix of the key. Keys may be assigned to bins based upon the prefixes of the keys. In some embodiments, keys with the same prefix are stored within the same bin. The keys and bins may be stored within append logs and sorted logs within the various levels of the log structured merge tree 208. These levels may include the level AO 250 of append logs, the level S1 252 of sorted logs, the level S2 254 of sorted logs, and the level S2 256 as the lowest level of sorted logs.

An append log is not sorted, and thus is expensive to traverse and search for keys. Accordingly, the append hash building process 122 builds hashes used to more efficiently locate keys within append hashes of the log structured merge tree 208. During operation 906 of method 900, the append hash building process 122 builds a first hash 1002 based upon keys tracked using append logs within the log structured merge tree 208. The first hash 1002 may comprise hash entries 1008 of location and metadata information. A hash entry includes a location of a key within a storage device of the distributed storage 106. The hash entry includes metadata information for a value paired with the key. The value and the key may be part of a key-value pair, and the metadata information may relate to the value (e.g., metadata of a file such as a create time of the file, a modify time of the file, a size of the file, a location of the file in the distributed storage, a name of the file, etc.). In some embodiments, the first hash 1002 may be based upon a 16 byte key. A bit range may be a last 32 bits of the 16 byte key. A prefix may be a first 2 bytes of the key. In this way, the bit range and/or prefix may be used to generate the first hash 1002.

During operation 908 of method 900, the append hash building process 122 builds a second hash 1004. The second hash 1004 is created based upon prefixes of the keys within the append logs. The second hash 1004 comprises a bucket per prefix (e.g., a first bucket for a first prefix, a second bucket for a second prefix, etc.). During operation 910 of method 900, the append hash building process 122 creates maps within the buckets of the second hash 1004. A map may be populated with entries that point to one or more of the hash entries 1008 within the first hash 1002 (e.g., a map within a bucket for a prefix may include entries/pointers pointing to hash entries for the prefix). During operation 912 of method 900, a request to obtain a range of keys having a particular prefix may be received. The prefix may be used to traverse the second hash 1004 to identify a map within a bucket for the prefix. The map includes a pointer to a hash entry that includes the range of keys having the prefix. In this way, a corresponding hash entry pointed to by the map may be used to efficiently locate the range of keys within an append log without searching the entire append log. In some embodiments, if the prefix is 2 bytes of less, then the map may be directly accessed for locating the range of keys based upon the hash entry pointed to by the map. If the prefix is more than 2 bytes (e.g., the range of keys spans multiple 2 byte prefixes and thus multiple bins), then pointers to multiple maps may be identified in the second hash 1004 and the multiple maps may be combined from buckets that include the range of keys. In this way, various ranges of keys may be efficiently located within unsorted append logs of the log structured merge tree 208.

Figure 11:
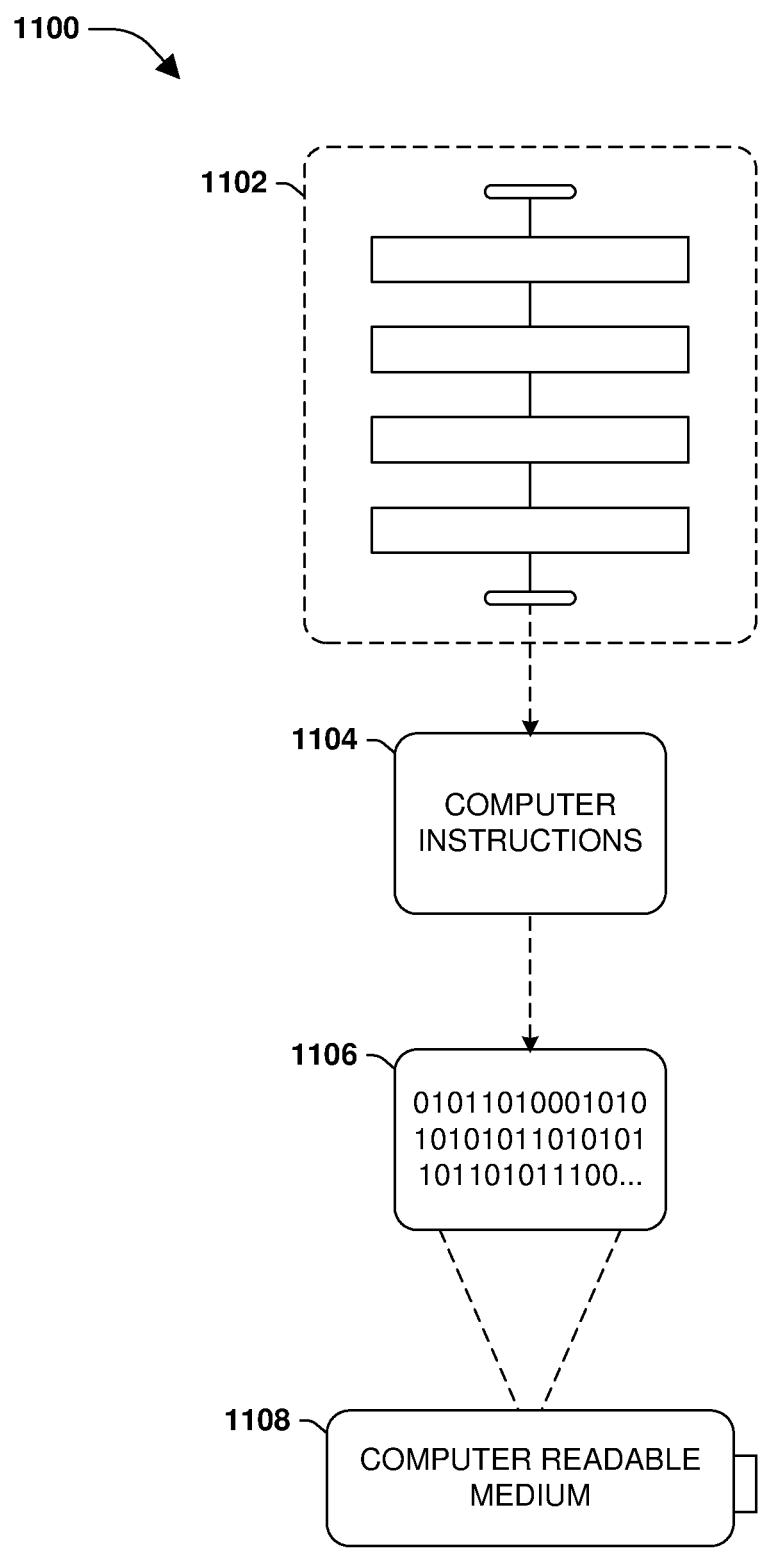
FIG. 11 is an example of a computer readable medium in which various embodiments of the present technology may be implemented.

FIG. 11 is an example of a computer readable medium 1100 in which various embodiments of the present technology may be implemented. An example embodiment of a computer-readable medium or a computer-readable device that is devised in these ways is illustrated in FIG. 11, wherein the implementation comprises a computer-readable medium 1108, such as a compact disc-recordable (CD-R), a digital versatile disc-recordable (DVD-R), flash drive, a platter of a hard disk drive, etc., on which is encoded computer-readable data 1106. The computer-readable data 1106, such as binary data comprising at least one of a zero or a one, in turn comprises processor-executable computer instructions 1104 configured to operate according to one or more of the principles set forth herein. In some embodiments, the processor-executable computer instructions 1104 are configured to perform at least some of the exemplary methods 1102 disclosed herein, such as method 300 of FIG. 3, method 500 of FIG. 5, method 700 of FIG. 7, and/or method 900 of FIG. 9, for example. In some embodiments, the processor-executable computer instructions 1104 are configured to implement a system, such as at least some of the exemplary systems disclosed herein, such as system 100 of FIG. 1, system 400 of FIG. 4, system 600 of FIG. 6, system 800 of FIG. 8, and/or system 1000 of FIG. 10, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
a distributed storage architecture including a plurality of worker nodes managing distributed storage comprised of storage devices hosted by the plurality of worker nodes; and
a worker node of the distributed storage architecture owning key value pairs of a key value store hosted within the distributed storage, wherein the worker node:
performs garbage collection rounds of a garbage collection process, wherein during a first garbage collection ground, the worker node:
receives a first set of probabilistic structures from the plurality of worker nodes, wherein the first set of probabilistic structures provide indications of keys that are in-use by the plurality of worker nodes;
compares the first set of probabilistic structures to a first set of keys of the key value pairs owned by the worker node to identify unused keys within the first set of keys that are not indicated by at least one probabilistic structure; and
frees key value pairs associated with the unused keys within the first set of keys; and
predicts, using a predictive read ahead mechanism, a second set of keys that will be evaluated during a second garbage collection round subsequent the first garbage collection round, wherein the second set of keys are pre-fetched from the storage devices and are cached into memory for evaluation during the second garbage collection round.

2. The system of claim 1, wherein during the second garbage collection round, the worker node:
receives a second set of probabilistic structures from the plurality of worker nodes, wherein the second set of probabilistic structures provide indications of keys that are in-use by the plurality of worker nodes at a point in time when the second set of probabilistic structures were created;
compares the second set of probabilistic structures to the second set of keys pre-fetched and cached within the memory to identify unused keys within the second set of keys that are not indicated by at least one probabilistic structure of the second set of probabilistic structures; and
frees key value pairs associated with the unused keys within the second set of keys.

3. The system of claim 1, wherein the worker node:
monitors a rate at which probabilistic structures are being received by the garbage collection process; and
selects an amount of keys for inclusion within the second set of keys based upon the rate at which the probabilistic structures are being received by the garbage collection process.

4. The system of claim 1, wherein the worker node:
monitors disk latency of the storage devices; and
selects an amount of keys for inclusion within the second set of keys based upon the disk latency of the storage devices.

5. The system of claim 1, wherein the worker node:
implements a feedback loop to collect operational statistics associated with performing garbage collection of the key value store; and
compares the operational statistics to a rate of prefetching and caching keys into memory in order to select an amount of keys for inclusion within the second set of key.

6. The system of claim 5, wherein the operational statistics correspond to at least one of an amount of unused keys being garbage collected, access patterns of the key value store, a fullness of the key value store, a timespan between garbage collection rounds, or a total time to complete a garbage collection round.

7. The system of claim 1, wherein the worker node:
monitors a rate of delete operations being performed upon the key value store; and
selects an amount of keys for inclusion within the second set of keys based upon the rate of the delete operations being performed.

8. The system of claim 1, wherein the worker node:
monitors a rate at which probabilistic structures are being validated by the garbage collection process; and
selects an amount of keys for inclusion within the second set of keys based upon the rate at which the probabilistic structures are being validated by the garbage collection process.

9. The system of claim 1, wherein the worker node:
dynamically adjusts amounts of keys pre-fetched and cached within the memory based upon a rate of processing probabilistic structures.

10. The system of claim 1, comprising:
a slice service generating probabilistic structures used to indicate in-use keys of the distributed storage that are used to store data, wherein a rate of the slice service sending the probabilistic structures to the garbage collection process is used by the predictive read ahead mechanism to determine a rate and amount of keys to pre-fetch.

11. The system of claim 1, comprising:
a block service, hosted by the worker node, managing bins of keys owned by the worker node, wherein a rate of the block service receiving probabilistic structures from slice slices of other worker nodes is used by the predictive read ahead mechanism to determine a rate and amount of keys to pre-fetch.

12. The system of claim 1, wherein the worker node:
in response to determining that a latency of accessing the storage devices exceed a threshold, selects an amount of keys as the second set of keys that is larger than an amount of keys of the first set of keys.

13. The system of claim 1, wherein the worker node:
in response to determining that a rate at which probabilistic structures are being validated by the garbage collection process exceeds a threshold, selects an amount of keys as the second set of keys that is larger than an amount of keys of the first set of keys.

14. The system of claim 1, wherein the worker node:
in response to determining that a rate at which delete operations are being processed and resulting in unused keys exceeds a threshold, selects an amount of keys as the second set of keys that is larger than an amount of keys of the first set of keys.

15. A method comprising:
implementing a feedback loop to collect operational statistics associated with performing garbage collection for a key value store hosted within distributed storage of a distributed storage architecture including a plurality of worker nodes managing the distributed storage comprised of storage devices hosted by the plurality of worker nodes;
comparing the operational statistics to a rate of prefetching and caching keys into memory in order to select an amount of keys to pre-fetch from the storage devices and cache within the memory for a next garbage collection round;
pre-fetching and caching the amount of keys as a set of keys within the memory; and
performing the next garbage collection round comprising:
receiving a set of probabilistic structures from the plurality of worker nodes, wherein the set of probabilistic structures provide indications of keys that are in-use by the plurality of worker nodes;
comparing the set of probabilistic structures to the set of keys cached within the memory to identify unused keys within the set of keys that are not indicated by at least one probabilistic structure; and
freeing key value pairs associated with the unused keys within the set of keys.

16. The method of claim 15, comprising:
dynamically adjusting amounts of keys pre-fetched and cached within the memory for subsequent garbage collection rounds based upon a rate of processing probabilistic structures.

17. The method of claim 15, comprising:
dynamically adjusting amounts of keys pre-fetched and cached within the memory for subsequent garbage collection rounds based upon a rate of delete operations being performed upon the key value store.

18. The method of claim 15, comprising:
dynamically adjusting amounts of keys pre-fetched and cached within the memory for subsequent garbage collection rounds based upon disk latency of the storage devices.

19. A non-transitory machine readable medium comprising instructions, which when executed by a machine, causes the machine to:
evaluate operational statistics associated with performing garbage collection of a key value store hosted within distributed storage of a distributed storage architecture including a plurality of worker nodes managing the distributed storage comprised of storage devices hosted by the plurality of worker nodes to select an amount of keys to pre-fetch from the storage devices and cache within memory for a garbage collection round;
pre-fetch and caching the amount of keys as a set of keys within the memory; and
perform the garbage collection round comprising:
receiving a set of probabilistic structures from the plurality of worker nodes, wherein the set of probabilistic structures provide indications of keys that are in-use by the plurality of worker nodes;
comparing the set of probabilistic structures to the set of keys cached within the memory to identify unused keys within the set of keys that are not indicated by at least one probabilistic structure; and
freeing key value pairs associated with the unused keys within the set of keys.

20. The non-transitory machine readable medium of claim 19, wherein the operational statistics correspond to at least one of an amount of unused keys being garbage collected, access patterns of the key value store, a fullness of the key value store, a timespan between garbage collection rounds, a total time to complete a garbage collection round.

* * * * *